US012728967B2

(12) United States Patent
Moore

(10) Patent No.: US 12,728,967 B2
(45) Date of Patent: Sep. 8, 2026

(54) SENSOR ASSEMBLY FOR WATERCRAFT, OPERATION SUPPORT SYSTEM AND WATERCRAFT

(71) Applicant: YAMAHA HATSUDOKI KABUSHIKI KAISHA, Iwata (JP)

(72) Inventor: Westleigh Moore, Kennesaw, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 259 days.

(21) Appl. No.: 18/667,275

(22) Filed: May 17, 2024

(65) Prior Publication Data

US 2024/0383584 A1 Nov. 21, 2024

Related U.S. Application Data

(60) Provisional application No. 63/503,464, filed on May 20, 2023.

(51) Int. Cl.

*B63B 79/15* (2020.01)
*B63B 79/10* (2020.01)
*G01D 11/24* (2006.01)
*G01D 11/30* (2006.01)

(52) U.S. Cl.

CPC .............. *B63B 79/15* (2020.01); *B63B 79/10* (2020.01); *G01D 11/245* (2013.01); *G01D 11/30* (2013.01); *G01D 11/305* (2013.01); *B63B 2213/02* (2013.01)

(58) Field of Classification Search

CPC .... G01D 11/245; G01D 11/30; G01D 11/305; B63B 79/10; B63B 79/15

See application file for complete search history.

(56) References Cited

U.S. PATENT DOCUMENTS

| | | | |
|---|---|---|---|
| 6,100,921 A * | 8/2000 | Rowley | B63C 11/49 348/148 |
| 9,260,165 B1 | 2/2016 | Springer | |
| 9,429,269 B2 | 8/2016 | Wilhelm | |
| 2016/0362164 A1 | 12/2016 | Page | |
| 2018/0033417 A1 | 2/2018 | Antao et al. | |
| 2022/0373662 A1 | 11/2022 | Crawford et al. | |

FOREIGN PATENT DOCUMENTS

| | | |
|---|---|---|
| EP | 2441660 A1 | 4/2012 |
| WO | 2018073731 A1 | 4/2018 |

OTHER PUBLICATIONS

The extended European Search Report issued Oct. 28, 2024 in corresponding European Application No. 24176727.6.

* cited by examiner

*Primary Examiner* — Paul M. West

(74) *Attorney, Agent, or Firm* — Spencer Fane LLP

(57) ABSTRACT

A sensor assembly for a watercraft comprises a sensor, an inserted portion, and an extended portion. The sensor includes at least one of a GPS transmitter, a GPS receiver, a camera, a radar device, a lidar device and a sonar device. The inserted portion is configured to be inserted into an accommodating space provided on a watercraft to accommodate an object. The extended portion is coupled to the inserted portion and configured to be located outside the accommodating space in a state where the sensor assembly is installed in the accommodating space. The sensor is housed in at least one of the inserted portion and the extended portion.

13 Claims, 13 Drawing Sheets

SENSOR ASSEMBLY FOR WATERCRAFT, OPERATION SUPPORT SYSTEM AND WATERCRAFT

CROSS-REFERENCE TO RELATED APPLICATIONS

This application claims the benefit of U.S. Provisional Application No. 63/503,464, filed on May 20, 2023. The entire disclosure of U.S. Provisional Application No. 63/503,464 is hereby incorporated herein by reference.

BACKGROUND

Technical Field

The present disclosure generally relates to the field of watercrafts. More particularly, the present disclosure relates to a sensor assembly for a watercraft having a sensor.

Background Information

Some watercrafts are equipped with an operation support system, such as a cruise control system, an auto-docking system, etc, for fully or partially autonomously maneuvering the watercraft. Typically, for the basic cruise control system, a driver manually attains a desired speed and then initiates the cruise control system to maintain the watercraft at the cruising speed set by the driver. The watercraft then travels at the selected speed relieving the driver regulating the throttle, while the watercraft steers automatically by following a path manually predefined by the user. This path is defined by what is commonly known as waypoints in the marine industry.

SUMMARY

Perception of the environment is crucial for such an operation support system to react to a dynamic environment in real-time. Thus, watercrafts are equipped with object sensing technology using sensors, such as a GPS transmitter, a GPS receiver, a camera, a radar device, a lidar device, a sonar device, etc.

On the other hand, onboard space is limited, and the sensors need to be arranged appropriate locations for effective perception of the environment. International Publication No. WO 2018/073731 or European Patent Application Publication No. EP 2 441 660 disclose a boat or ship equipped with various sensors, for example, but they do not provide detailed explanations on how to install the sensors.

Generally, the present disclosure is directed to a sensor assembly for any watercraft such as an outboard motor boat, a personal watercraft, a jet boat, a pontoon boat, etc. The present disclosure is also directed to an operation support system and a watercraft equipped with the sensor assembly.

In accordance with one aspect of the present disclosure, a sensor assembly for a watercraft comprises a sensor, an inserted portion, and an extended portion. The sensor includes at least one of a GPS transmitter, a GPS receiver, a camera, a radar device, a lidar device and a sonar device. The inserted portion is configured to be inserted into an accommodating space provided on a watercraft to accommodate an object. The extended portion is coupled to the inserted portion and configured to be located outside the accommodating space in a state where the sensor assembly is installed in the accommodating space. The sensor is housed in at least one of the inserted portion and the extended portion.

Also, other features, aspects and advantages of the disclosed sensor assembly, the disclosed operation support system and the disclosed watercraft will become apparent to those skilled in the watercraft field from the following detailed description, which, taken in conjunction with the annexed drawings, discloses several illustrative embodiments of a sensor assembly, an operation support system and a watercraft with various features.

BRIEF DESCRIPTION OF THE DRAWINGS

Referring now to the attached drawings which form a part of this original disclosure, watercrafts are illustrated having an operation support system with a watercraft sensor assembly.

Figure 1:
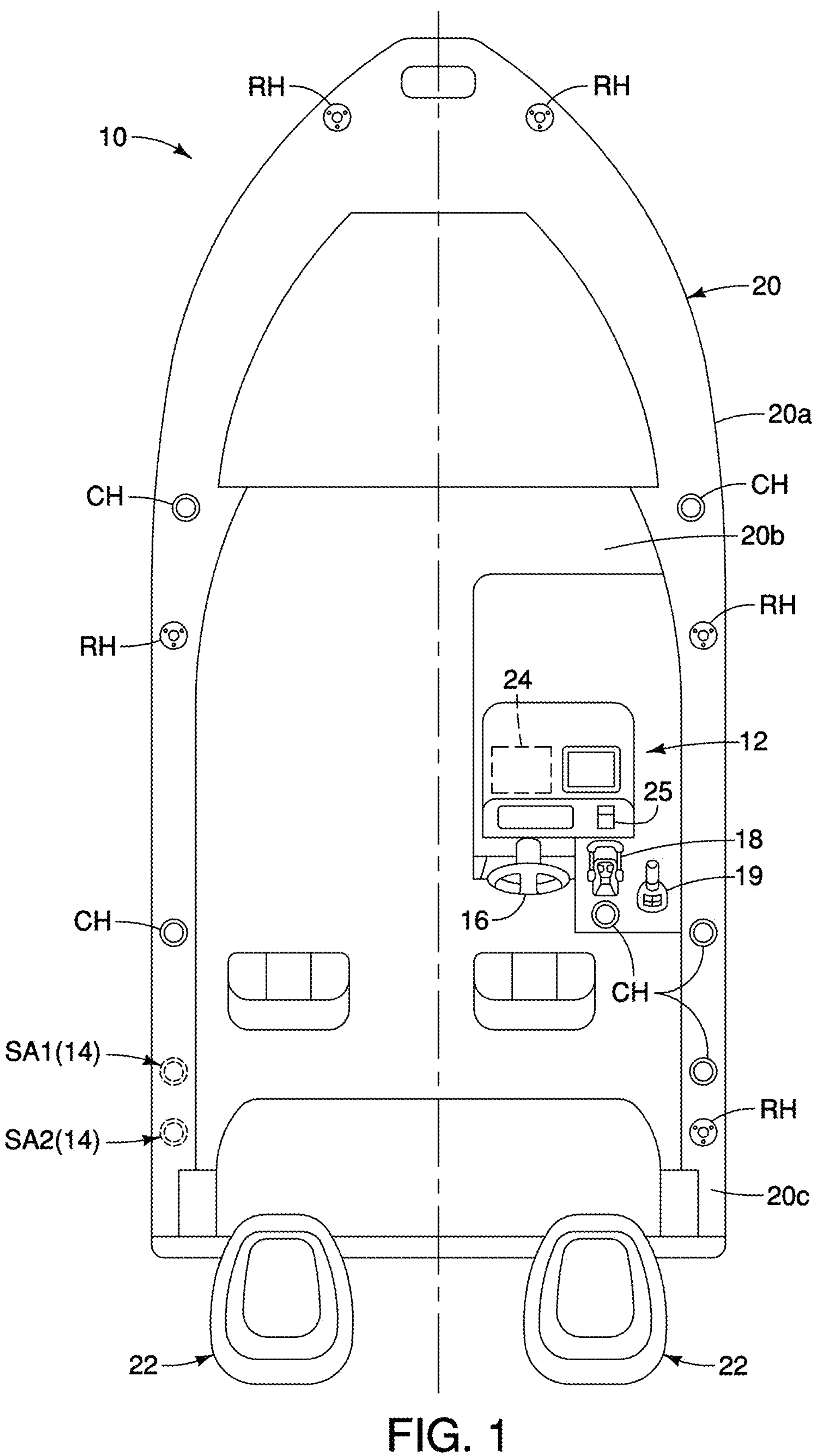
FIG. 1 is a schematic top view of a watercraft equipped with an operation support system in accordance with the present disclosure.

It should be noted that these figures are intended to illustrate the general characteristics of methods, structures and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the watercraft field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

First Embodiment

Referring initially to FIG. 1, a watercraft 10 is illustrated in accordance with one embodiment. The watercraft 10 includes a watercraft control system 12 (e.g., an operation support system) that is configured to fully or at least partially autonomously navigate the watercraft 10 in various operation modes, such as adaptive cruise control, autopilot or auto-docking control, satellite positioning control, etc. The watercraft control system 12 can be integrated with a main watercraft control system of the watercraft 10, or can be an add-on watercraft control system that supplements the main watercraft control system of the watercraft 10. In either case, the watercraft 10 is equipped with the watercraft control system 12 for fully or partially autonomously maneuvering the watercraft 10.

In the illustrated embodiment, the watercraft control system 12 of the watercraft 10 includes at least one watercraft sensor assembly (e.g., at least one sensor assembly for a watercraft) with a sensor or detector 14 that is configured to detect peripheral environment or operation state of the watercraft 10 in real-time. Preferably, the sensor 14 includes one or more active sensors, such as a laser device, a lidar device, a sonar device, or a millimeter-wave radar, etc. However, the sensor 14 can also include an image recognition device and/or optical sensors, such as one or more cameras. Furthermore, the sensor 14 can include a GPS transmitter and/or a GPS receiver. In the illustrated embodiment, the watercraft control system 12 includes first and second watercraft sensor assemblies SA1 and SA2 having different sensors 14.

In the illustrated embodiment, the watercraft 10 is further configured to be driven in an autopilot mode or a manual mode. Here, the watercraft 10 is provided with a drive-by-wire system that operates the watercraft 10, and that is configured to perform various operations of the watercraft 10. Specifically, as shown in FIG. 1, the watercraft 10 is provided with a cockpit that has a steering wheel or helm 16 and a remote control 18. The steering wheel 16 is used by a driver or user (hereinafter merely referred to as a "user") of the watercraft 10 to manually turn the watercraft 10, and thus, manually change a propulsion direction of the watercraft 10. The remote control 18 is used by the user to manually control a propulsion force of the watercraft 10. Furthermore, as shown in FIG. 1, the cockpit has a joystick 19 that is used by the user to simultaneously control a steering and a propulsion force of the watercraft 10 to move and turn the watercraft 10 in any direction. In the autopilot mode, the user sets a cruising speed for the watercraft 10 and a travel path defined by waypoints in a conventional manner. In particular, in the autopilot mode, the watercraft control system 12 of the watercraft 10 servers as an autopilot or cruise control system of the watercraft 10, and is configured to autonomously navigate the watercraft 10 at the preset cruising speed along the travel path based on data obtained by the sensors 14 of the first and second watercraft sensor assemblies SA1 and SA2 and/or other onboard sensors or detectors. Furthermore, in the illustrated embodiment, the watercraft 10 is further configured to be driven in other operational modes, such as an auto-docking mode for autonomously navigating the watercraft 10 toward a target dock based on data obtained by the sensors 14 of the first and second watercraft sensor assemblies SA1 and SA2 and/or other onboard sensors or detectors.

In the illustrated embodiment, as seen in FIG. 1, the watercraft 10 basically includes a watercraft body 20 and one or more (two in FIG. 1) propulsion units 22. Here, the watercraft 10 is illustrated as an outboard motor boat that is equipped with the watercraft control system 12. However, the watercraft control system 12 is not limited to being used with an outboard motor boat. Rather, the watercraft control system 12 can be applied to practically any watercraft that includes a propulsion system and a steering system, such as a personal watercraft, a jet boat, a pontoon boat, etc.

In the illustrated embodiment, the first and second watercraft sensor assemblies SA1 and SA2 are installed to the watercraft body 20. As seen in FIG. 1, the watercraft body 20 basically includes a hull 20*a* and a deck 20*b*. The deck 20*b* is provided on the hull 20*a* in a conventional manner. Preferably, the hull 20*a* and the deck 20*b* are integrated to form a unit. The hull 20*a*, the deck 20*b* and the other parts of the watercraft 10 are made of suitable materials that are typically used in watercrafts for a marine environment, and thus, the materials of the various parts of the watercraft 10 will not be discussed herein. However, the watercraft body 20 is not limited to the illustrated hull and deck construction. Rather, the construction of the watercraft body 20 depends on the type of watercraft 10. For example, a watercraft body of a pontoon boat typically includes two or more pontoons that support a deck. Also, for example, the watercraft body may not have a deck.

As seen in FIG. 1, the watercraft 10 includes a plurality of cup or drink holders CH for holding a cup or other object, and a plurality of rod or flag holders RH for holding a fishing rod, a flag pole or other object on the watercraft body 20. Specifically, in the illustrated embodiment, the cup holders CH are located in the cockpit or on a gunwale 20*c* at the top of the hull 20*a*, while the rod holders RH are located on the gunwale 20*c*. However, the location of the cup holders CH and the rod holders RH are not limited to the illustrated location.

Figure 2:
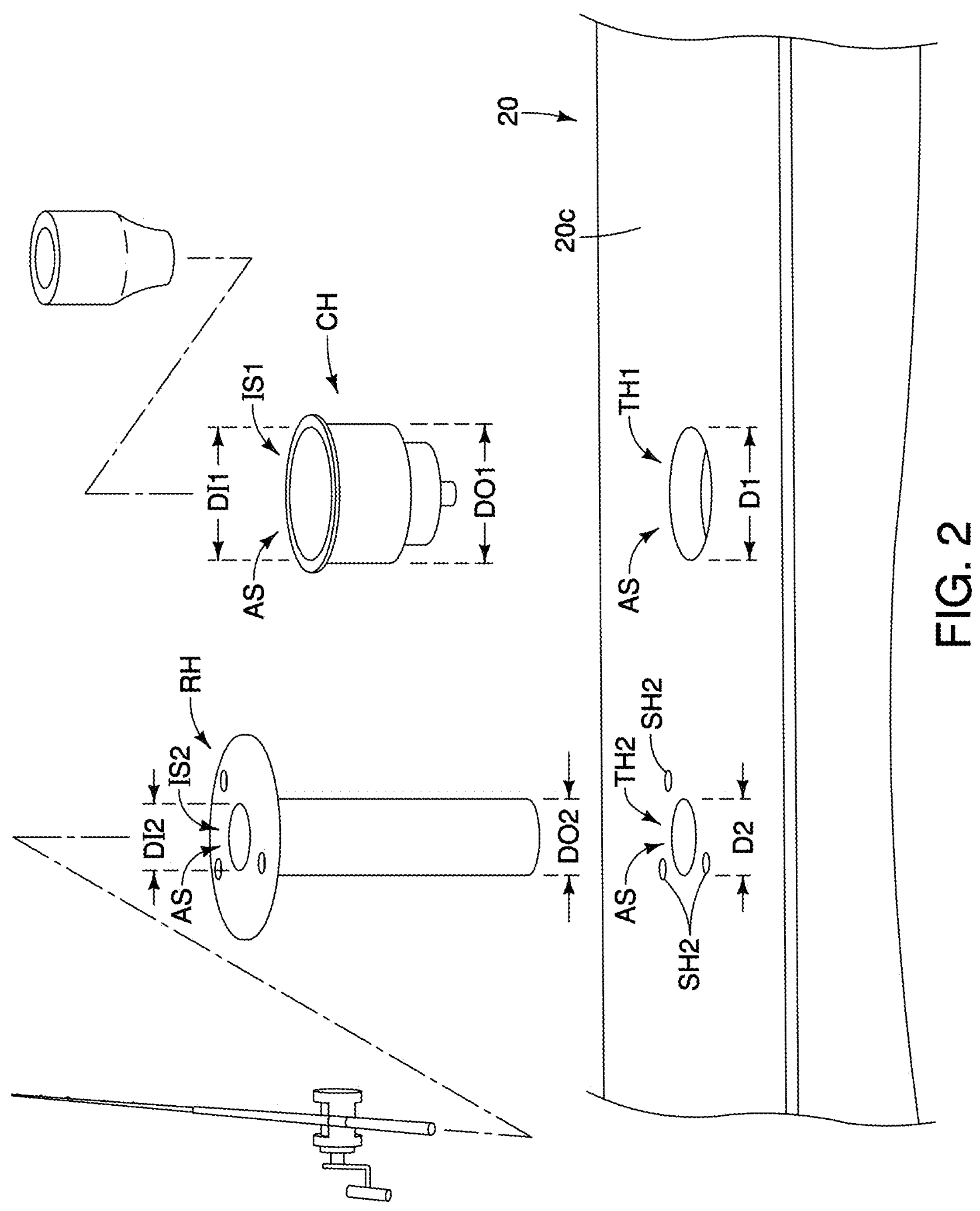
FIG. 2 is a schematic exploded partial perspective view of a side portion of the watercraft, showing installations of a cup holder and a rod holder to a gunwale of the watercraft.

As seen in FIG. 2, the cup holders CH are each inserted and attached to a through hole TH1 provided to the gunwale 20*c* or the cockpit, while the rod holders RH are each inserted and attached to a through hole TH2 provided to the gunwale 20*c*. The through holes TH1 have a diameter D1 corresponding to an outer diameter DO1 of the cup holders CH to receive the cup holders CH, respectively, while the through holes TH2 have a diameter D2 corresponding to an outer diameter DO2 of the rod holders RH to receive the rod holders RH, respectively. In the illustrated embodiment, the cup holders CH are fitted in the through holes TH1, while the rod holders RH are fixedly attached to the through holes TH2 using fasteners, such as bolts or screws that are threaded into screw holes SH2 or bolts. However, the cup holders CH and the rod holders RH can be attached to the watercraft body 20 with any other conventional fasters or fixing means, as needed and/or desired.

In the illustrated embodiment, the cup holders CH each have a cylindrical interior space IS1 with an inner diameter DI1 for accommodating a cup or other object, while the rod holders RH each have a cylindrical interior space IS2 with an inner diameter DI2 for accommodating a fishing rod, a flag pole or other object. Thus, while the cup holders CH and the rod holders RH are attached to the gunwale 20*c* of the watercraft body 20, objects, such as a cup, a fishing rod, etc., are at least partially accommodated within the interior spaces IS1 and IS2, which are also at least partially accommodated within an interior space of the hull 20*b* through the through holes TH1 and TH2. Thus, in the illustrated embodiment, the interior spaces IS1 and IS2 and/or the interior space of the hull 20*b* with the through holes TH1 and TH2 form an "accommodating space AS" that is provided on the watercraft 10 to accommodate the object. The configurations of the cup holders CH and the rod holders RH are relatively conventional, and thus the configurations of the cup holders CH and the rod holders RH will not be discussed in detail.

Figure 3:
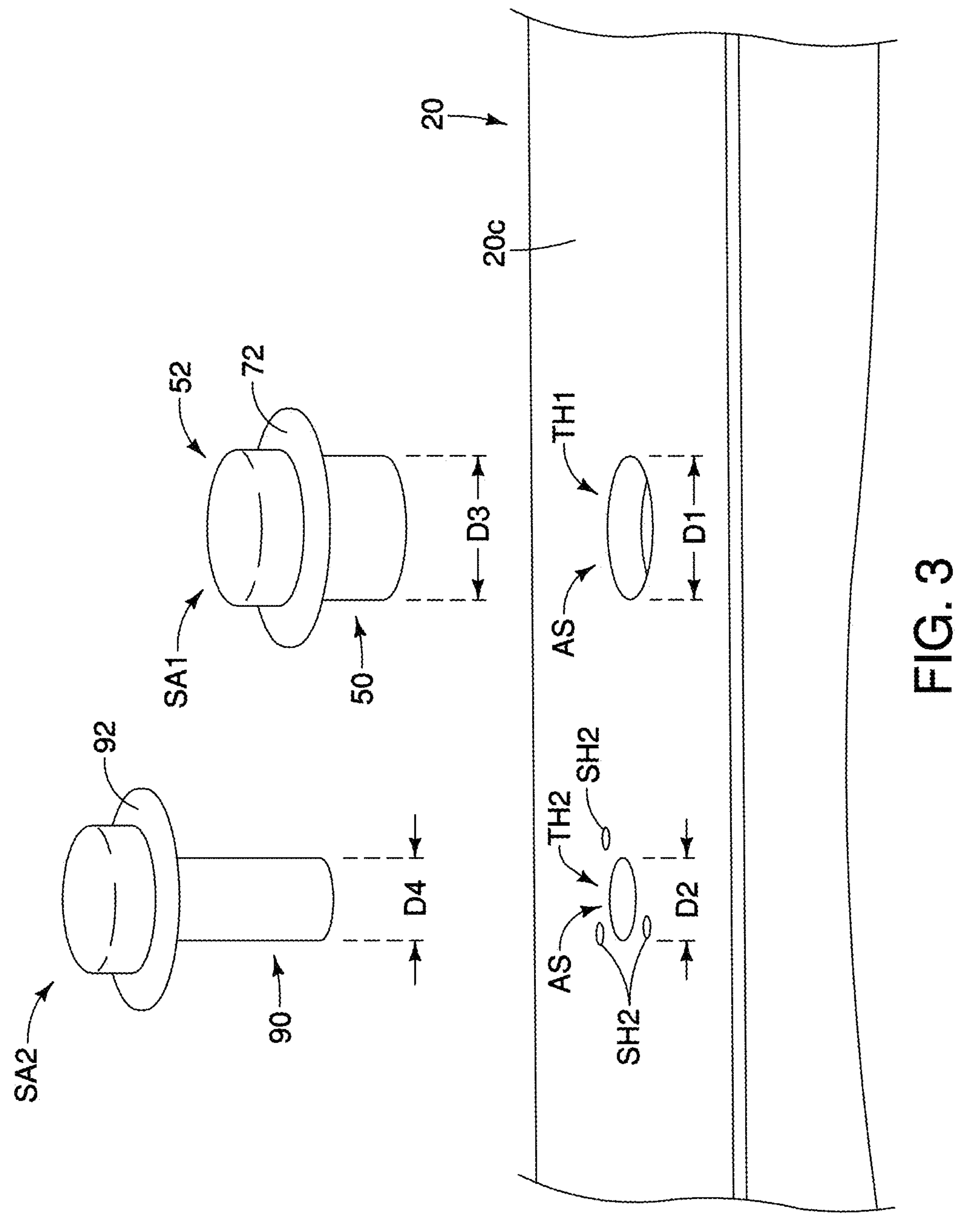
FIG. 3 is a schematic exploded partial perspective view of the side portion of the watercraft, showing installations of the watercraft sensor assemblies to the gunwale of the watercraft in replace of the cup holder and the rod holder.
Figure 4:
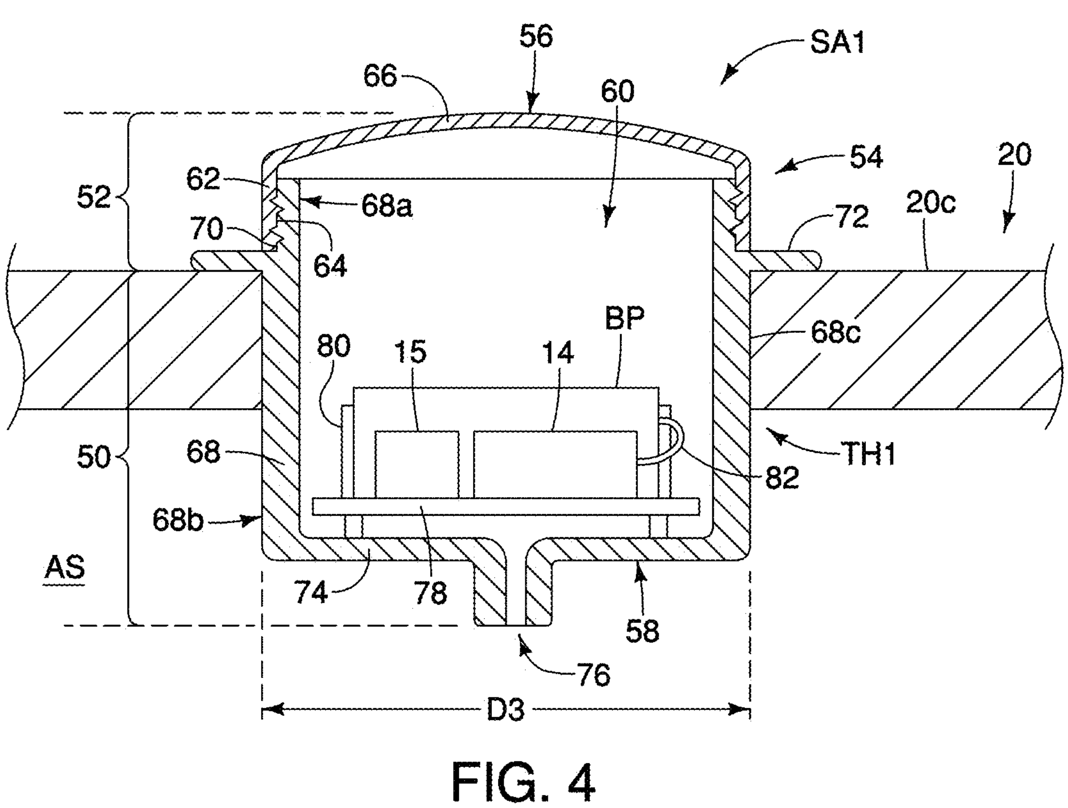
FIG. 4 is a cross-sectional view of the watercraft sensor assembly in accordance with a first embodiment.
Figure 5:
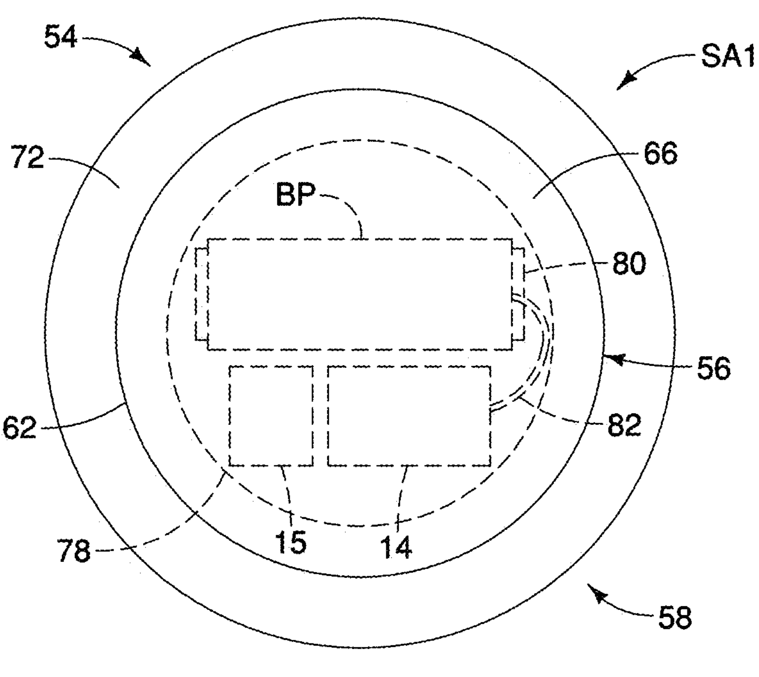
FIG. 5 is a top view of the watercraft sensor assembly shown in FIG. 4.

In the illustrated embodiment, as seen in FIGS. 3-5, the first watercraft sensor assembly SA1 is inserted and attached to one of the through holes TH1 in replace of one of the cup holders CH, while the second watercraft sensor assembly SA2 is inserted and attached to one of the through holes TH2 in replace of one of the rod holders RH. In other words, one of the through holes TH1 is utilized to install the first watercraft sensor assembly SA1 to the watercraft body 20, while one of the through holes TH2 is utilized to install the second watercraft sensor assembly SA2 to the watercraft body 20. The configurations of the first and second watercraft assemblies SA1 and SA2 will be discussed later in detail by referring to FIGS. 3-5.

As seen in FIG. 1, the propulsion units 22 are provided to propel the watercraft 10 in a conventional manner. In the illustrated embodiment, two of the propulsion units 22 are provided in the form of two outboard motors. However, the propulsion units 22 are not limited to this illustrated configuration of the illustrated embodiment. It is acceptable for the propulsion units to be inboard motors or water jet propulsion devices instead of outboard motors. While the watercraft 10 is illustrated as having two of the propulsion units 22, it will be apparent from this disclosure that the watercraft 10 can have only a single propulsion unit, three or more propulsion units, as needed and/or desired, depending on the particular design of the watercraft.

Figure 6:
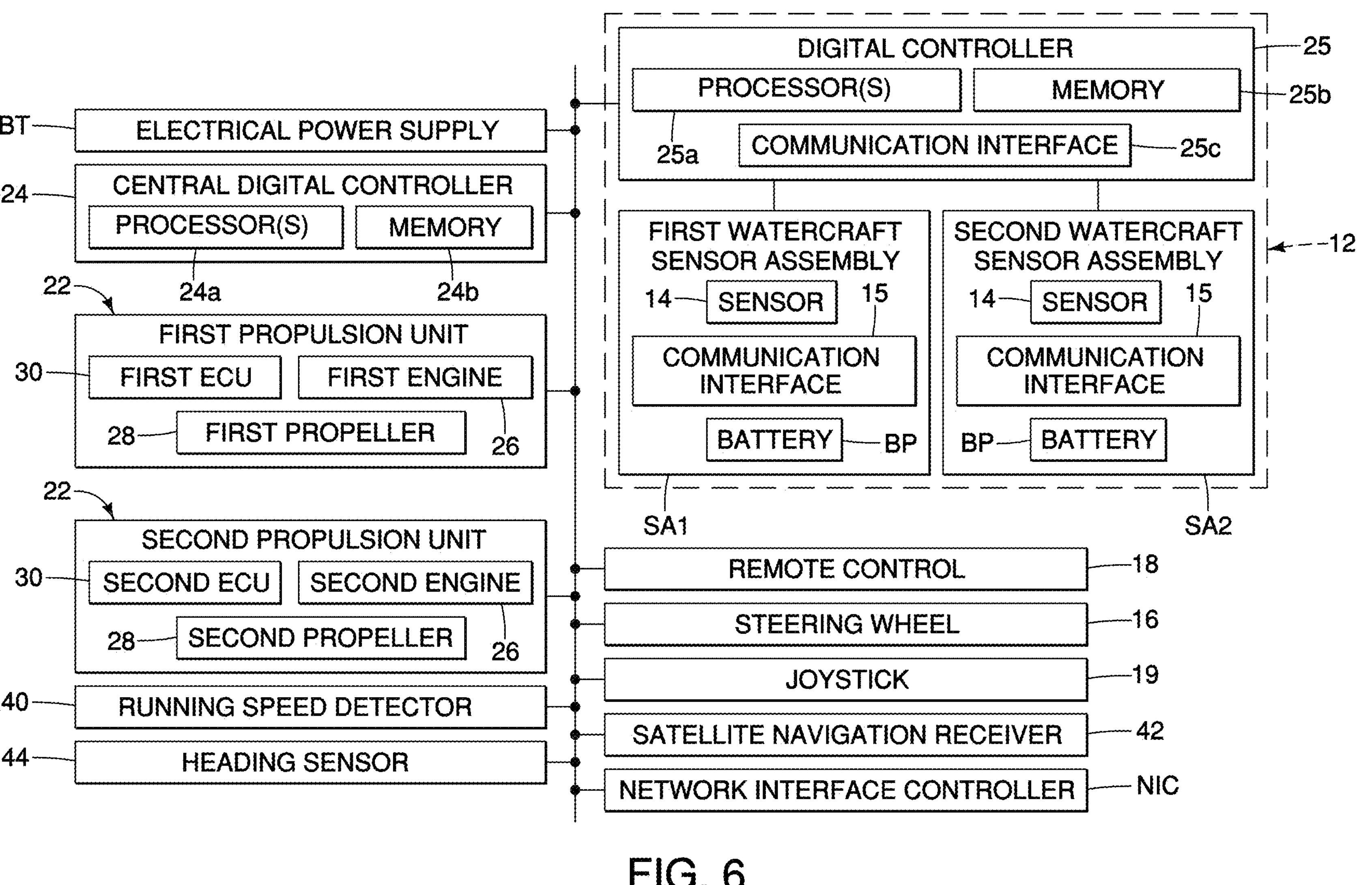
FIG. 6 is a block diagram of selected components of the watercraft equipped with the operation support system.

FIG. 6 illustrates a block diagram of selected components of the watercraft 10. As schematically illustrated in FIG. 6, the watercraft 10 is provided with a central digital controller 24 that is connected to a network of the watercraft 10, and the watercraft control system 12 is provided with a digital controller 25 (e.g., an electronic controller) that is connected to the network of the watercraft 10. For example, the network of the watercraft 10 can be Controller Area Network (CAN bus) that allow microcontrollers and devices to communicate with each other. The central digital controller 24 and the digital controller 25 can also be referred to as a boat control unit (BCU). In FIG. 6, the watercraft control system 12 is illustrated as an add-on component of the watercraft 10. However, some or all of the functions of the digital controller 25 could be integrated into the central digital controller 24. Thus, the term "digital controller" is not limited to a single controller having one or more processors, but rather includes one controller as well as two or more controllers that are physically separated from each other. Also as seen in FIG. 6, the watercraft 10 is provided with an electrical power supply BT for supplying electrical power the central digital controller 24 and the digital controller 25 as well as to the various electrical components of the watercraft 10.

The central digital controller 24 can be a microcomputer. The central digital controller 24 includes a processor 24*a*, such as a CPU (Central Processing Unit) and memory 24*b* (computer storage) such as a ROM (Read Only Memory) and a RAM (Random Access Memory). The central digital controller 24 can also include other conventional components such as an input interface circuit and an output interface circuit. The memory 24*b* of the central digital controller 24 stores processing results, detection results and control programs such as ones for controlling the watercraft 10. For example, the RAM stores statuses of operational flags and various control data, while the ROM stores the control programs for various operations.

In the illustrated embodiment, the central digital controller 24 is programmed to control the propulsion units 22 in accordance with operation signals from the steering wheel 16 and the remote control 18 as well as control signals or settings from the watercraft control system 12. The basic controls of the propulsion units 22 in accordance with the operation signals from the steering wheel 16 and the remote control 18 are relatively conventional, and thus the basic controls of the propulsion units 22 will not be discussed in detail herein. The central digital controller 24 can also be programmed to automatically control the propulsion units 22 based on detection results of onboard sensors or detectors.

While the central digital controller 24 and the watercraft control system 12 are illustrated as separate components in which the watercraft control system 12 is connected to the network of the watercraft 10, the watercraft control system 12 can be integrated with the central digital controller 24. In other words, here, the watercraft control system 12 is an add-on component that is plugged into the network of the watercraft 10. Thus, as illustrated in FIG. 6, the watercraft control system 12 includes its own digital controller 25 having at least one processor 25*a*, such as a CPU (Central Processing Unit) and a memory 25*b* such as a ROM (Read Only Memory) and a RAM (Random Access Memory). On the other hand, if the watercraft control system 12 is fully integrated into the watercraft 10, then the watercraft control system 12 can use the central digital controller 24 to carry out adaptive cruise control, autopilot or auto-docking control, satellite positioning control, etc.

The digital controller 25 is configured to communicate with the first and second watercraft sensor assemblies SA1 and SA2, and is configured to receive data obtained by the sensors 14 of the first and second watercraft sensor assemblies SA1 and SA2 to control an operation of the watercraft 10. Here, for example, as seen in FIG. 6, the first and second watercraft sensor assemblies SA1 and SA2 each further comprise a communication interface 15 (e.g., I/O interfaces or communicators) configured to transmit data obtained by the sensors 14 to the digital controller 25, and an electrical power supply or battery BP that supplies electrical power to the sensor 14 and/or the communication interface 15. The digital controller 25 is provided with a communication interface 25*c* (e.g., an I/O interface) that is used to communicate with the communication interfaces 15 of the first and second watercraft sensor assemblies SA1 and SA2 either wirelessly or via a wired connection to the network of the watercraft 10. Here, for example, the digital controller 25 is plugged into a network interface controller NIC (e.g., a MicroAutoBox by dSpace). The processor 25*a* of the digital controller 25 communicates with the digital controller 24. In this way, the digital controller 25 can communicate with the central digital controller 24 as well as communicate with the other components of the watercraft 10 that are connected to the network of the watercraft 10. In the illustrated embodiment, the processor 25*a* of the digital controller 25 is programmed to control the various components of the watercraft 10 such as adaptive cruise control, autopilot or auto-docking control, satellite positioning control, etc., based on the data obtained by the sensors 14 of the first and second watercraft sensor assemblies SA1 and SA2.

Still referring to FIG. 6, each of the propulsion units 22 basically includes an internal combustion engine 26 and a propeller 28. Here, each of the propulsion units 22 further includes an engine control unit 30 (ECU). Alternatively, for example, the engine control units 30 can be omitted and the control of the internal combustion engines 26 can be performed by the central digital controller 24 and/or the digital controller 25. Here in FIG. 6, the engines 26 are referred to as a first engine and a second engine to distinguish the engines 26. Likewise, in FIG. 6, the propellers 28 are referred to as a first propeller and a second propeller. Also, in FIG. 6, the engine control units 30 are referred to as a first ECU and a second ECU. Furthermore, each of the propulsion units 22 is also provided with a steering actuator, a steering angle sensor, etc. Since the propulsion units 22 are relatively conventional parts of a watercraft, the configurations of the propulsion units 22 will not be discussed or illustrated in detail herein. However, in the illustrated embodiment, each of the engine control units 30 is a digital controller similar in configuration to the configuration of the central digital controller 24 that is previously discussed. Each of the engine control units 30 is programmed to control its respective propulsion unit 22 based on the controls or commands by the central digital controller 24 and/or the digital controller 25. Specifically, each of the engine control units 30 is programmed to control its respective propulsion unit 22 to independently generate the propulsion forces (e.g., a forward drive thrust and a reverse drive thrust) of the propulsion units 22, respectively, and to independently steer or turn the propulsion units 22, respectively, in order to propel and steer the watercraft 10.

As seen in FIG. 6, for example, the watercraft 10 can be provided with a running speed detector 40 (e.g., a GPS speedometer, a pitot speedometer, etc.), at least one satellite navigation receiver 42 (e.g., a Global Positioning System (GPS) receiver, a Navigation Satellite System (NSS) receiver, or a Global Navigation Satellite System (GNSS) receiver), and a heading sensor 44 (e.g., on-board gyro and tilt sensors). The running speed detector 40, the satellite navigation receiver 42 and the heading sensor 44 are connected to the central digital controller 24 and/or the digital controller 25 by the network of the watercraft 10. Thus, the central digital controller 24 and/or the digital controller 25 receive the speed of the watercraft 10, the position or location of the watercraft 10, and the heading of the watercraft 10 based on detection results from various receivers, detectors and/or sensors. Of course, the running speed detector 40, the satellite navigation receiver 42, and the heading sensor 44 can be provided in different manner. In particular, the running speed detector 40, the satellite navigation receiver 42, and the heading sensor 44 can also be provided to the first and second watercraft sensor assemblies SA1 and SA2 as the sensors 14.

Referring now to FIGS. 3-5, the configurations of the first watercraft sensor assembly SA1 will be discussed. In the illustrated embodiment, as seen in FIGS. 3-5, the first watercraft sensor assembly SA1 comprises the sensor 14, an inserted portion 50 and an extended portion 52. The inserted portion 50 is inserted into the accommodating space AS. The extended portion 52 is coupled to the inserted portion 50. The extended portion 52 is located outside the accommodating space AS in a state where the first watercraft sensor assembly SA1 is installed in the accommodating space AS. In the illustrated embodiment, the sensor 14 is housed in the inserted portion 50.

As seen in FIGS. 4 and 5, the first watercraft sensor assembly SA1 includes a housing 54 that houses the sensor 14 therewithin. The housing 54 includes an upper housing 56 and a lower housing 58 that are coupled to each other to form an interior housing space 60. The upper housing 56 has an annular or cylindrical sidewall 62 with an internal thread 64 and a top wall 66 that is connected to the annular sidewall 62 at an upper end of the annular sidewall 62. In the illustrated embodiment, the upper housing 56 forms a screw cap of the housing 54 to close off the interior housing space 60. The upper housing 56 is integrally formed as a one-piece, unitary member. The upper housing 56 is made of suitable materials that are typically used in watercrafts for a marine environment and are suitable for sensing operations of the sensor 14. For example, the upper housing 56 is made of suitable synthetic resin or metallic material.

The lower housing 58 has an annular or cylindrical sidewall 68 with an upper end 68*a* and a lower end 68*b*. The upper end 68*a* defines an upper opening that is closed off by the upper housing 56 when the upper housing 56 is attached to the lower housing 58. The annular side wall 68 has an external thread 70 near the upper end 68*a* and a mounting flange 72 that protrudes perpendicularly and radially outward from an outer peripheral surface 68*c* of the annular sidewall 68. As seen in FIG. 5, the mounting flange 72 has a circular outer shape, and is concentrically arranged relative to the outer peripheral surface 68*c* of the annular sidewall 68. The external thread 70 of the lower housing 58 is coupled to the internal thread 64 of the upper housing 56 to fixedly couple the upper housing 56 and the lower housing 58. The lower housing 58 further has a bottom wall 74 that is connected to the annular sidewall 68 at the lower end 68*b*. In the illustrated embodiment, the lower housing 58 has a drain opening 76 on the bottom wall 74. With this configuration, when the upper housing 56 and the lower housing 58 are coupled to each other, the interior housing space 60 is sealed from outside in a watertight manner, except for the drain opening 76. In the illustrated embodiment, the lower housing 58 is integrally formed as a one-piece, unitary member. The lower housing 58 is made of suitable materials that are typically used in watercrafts for a marine environment and are suitable for sensing operations of the sensor 14. For example, the lower housing 58 is made of suitable synthetic resin or metallic material.

In the illustrated embodiment, as mentioned above, the first watercraft sensor assembly SA1 is inserted and attached to the through hole TH1 in replace of the cup holder CH. As seen in FIG. 4, when the first watercraft sensor assembly SA1 is inserted and attached to the through hole TH1, the mounting flange 72 is rested on an edge portion of the through hole TH1 above the gunwale 20*c* of the watercraft body 20. Thus, in the illustrated embodiment, a lower part of the lower housing 58 below the mounting flange 72 forms the inserted portion 50 of the first watercraft sensor assembly SA1, while the upper housing 56, an upper part of the lower housing 58 above the mounting flange 72, and the mounting flange 72 form the extended portion 52. Thus, in the illustrated embodiment, the inserted portion 50 has the drain opening 76 at an end opposite to the extended portion 52.

In the illustrated embodiment, the housing 54 is formed by the upper housing 56 and the lower housing 58 that are coupled to each other. Of course, the housing 54 can have different configurations. For example, the mounting flange 72 can be provided to the upper housing 56, the external thread 70 can be provided to the upper housing 56 while the internal thread 64 can be provided to the lower housing 58, the upper housing 56 can be extended below the edge portion of the through hole TH1, etc.

As seen in FIGS. 3 and 4, the annular sidewall 68 (the outer peripheral surface 68*c*) has an outer diameter D3 corresponding to the diameter D1 of the through hole TH1. Specifically, the diameter D3 of the annular sidewall 68 is smaller than the diameter D1 of the through hole TH1 such that the inserted portion 50 can be inserted to the through hole TH1. In the illustrated embodiment, the diameter D3 is slightly smaller than the diameter D1 so that the outer peripheral surface 68*c* of the annular sidewall 68 is fitted with an inter peripheral surface of the through hole TH1. Thus, in this case, the first watercraft sensor assembly SA1 is securely attached to the watercraft body 20 by merely applying an adhesive and/or a sealing material between the mounting flange 72 and the edge portion of the through hole TH1. However, of course, the first watercraft sensor assembly SA1 can be secured to the watercraft body 20 in different conventional manner. For example, the first watercraft sensor assembly SA1 can be secured to the watercraft body 20 using fixing parts or fasteners, such as bolts or screws that are fastened to screws holes provided on the gunwale 20*c* through clearance holes provided on the mounting flange 72.

As seen in FIG. 4, the sensor 14 and the communication interface 15 are housed in the interior housing space 60. Specifically, the sensor 14 and the communication interface 15 are mounted on a printed wiring board or substrate 78, and are electrically connected to each other. In the illustrated embodiment, the first watercraft sensor assembly SA1 further has a battery compartment 80 on the substrate 78. The battery compartment 80 holds the battery BP that is electrically connected to the sensor 14 and/or the communication interface 15 via an electrical wire 82. Thus, in the illustrated embodiment, the first watercraft sensor assembly SA1 further comprises the battery compartment 80 and the electrical wire 82 that is electrically connected to the sensor 14 and is electrically connected to the battery BP. As seen in FIG. 4, the sensor 14, the communication interface 15 and the battery BP are mounted on the substrate 78 and are placed on the bottom wall 74. Thus, the sensor 14, the communication interface 15 and the battery BP are fully located inside the inserted portion 50 of the first watercraft sensor assembly SA1. Of course, the sensor 14, the communication interface 15 and the battery BP are housed in the interior housing space 60 in different manner. For example, the sensor 14, the communication interface 15 and the battery BP can be fully located inside the extended portion 52, or can be partially located inside the inserted portion 50 and partially located inside the extended portion 52. Also, as seen in FIG. 4, the electrical wire 82 and the substrate 78 are fully located inside the inserted portion 50 of the first watercraft sensor assembly SA1. Of course, the electrical wire 82 and the substrate 78 can be fully located inside the extended portion 52, or can be partially located inside the inserted portion 50 and partially located inside the extended portion 52. In the illustrated embodiment, the sensor 14 and the communication interface 15 are electrically connected to each other via the substrate 78. Of course, the sensor 14 and the communication interface 15 are electrically connected to each other via an electrical wire, which can be fully or partially located inside the inserted portion 50 or the extended portion 52 depending on the arrangement of the sensor 14 and the communication interface 15.

In the illustrated embodiment, the communication interface 15 is illustrated as a wireless communicator that is wirelessly communicated to the communication interface 25*c* of the digital controller 25 via Wi-Fi connection, Bluetooth link, Near-field communication, etc. However, the communication interface 15 can be communicated to the communication interface 25*c* of the digital controller 25 via a wired connection. In this case, the communication interface 15 can be connected to the communication interface 25*c* or the network interface controller NIC via an electrical cable that is routed inside the watercraft body 20 from the communication interface 15 to the communication interface 25*c* or the network interface controller NIC through a cable hole formed on the housing 54 of the first watercraft sensor assembly SA1.

Furthermore, in the illustrated embodiment, the battery BP is illustrated as being housed in the interior housing space 60 to supply electric power to the sensor 14 and/or the communication interface 15. However, electric power can be supplied to the sensor 14 and/or the communication interface 15 from a battery located outside the interior housing space 60 via an electric cable routed through a cable hole formed on the housing 54 of the first watercraft sensor assembly SA1.

In the illustrated embodiment, as seen in FIG. 4, the sensor 14 and the communication interface 15 are disposed on the bottom of the first watercraft sensor assembly SA1. The housing 54 of the first watercraft sensor assembly SA1 is made to ensure that communication signals or sensing signals may pass through the housing 54 with minimal interference. As mentioned above, such communication technologies include Wi-Fi connection, Bluetooth link, Near-field communication, satellite link or other radio communication by the communication interface 15, while such sensing technologies include sensing using sonar, lidar, radar, GPS, or cameras by the sensor 14. Furthermore, the first watercraft sensor assembly SA1 can further be modified to include complementary materials or wirings or to have different configurations in order to amplify the communication signals or the sensing signals via techniques of reflection, refraction and diffraction, in order to convert analog signal to digital signal of the communication or sensing technology, and/or in order to pass the communication signals or the sensing signals through the housing 54.

As seen in FIG. 3, the configurations of the first and second watercraft sensor assemblies SA1 and SA2 are the same, except that the first watercraft sensor assembly SA1 is dimensioned such that the first watercraft sensor assembly SA1 is attachable to the through hole TH1, while the second watercraft sensor assembly SA2 is dimensioned such that the second watercraft sensor assembly SA2 is attachable to the through hole TH2. Therefore, the description of the first watercraft sensor assembly SA1 illustrated in FIGS. 4 and 5 also applies to the second watercraft sensor assembly SA2, and thus the configurations of the second watercraft sensor assembly SA2 will not be discussed in detail herein. In the illustrated embodiment, as seen in FIG. 3, the inserted portion 50 of the first watercraft sensor assembly SA1 has the outer diameter D3, while an inserted portion 90 of the second watercraft sensor assembly SA2 has an outer diameter D4 corresponding to the diameter D2 of the through hole TH2. Furthermore, the second watercraft sensor assembly SA2 can be secured to the watercraft body 20 using fixing parts or fasteners, such as bolts or screws that are fastened to the screw holes SH2 provided on the gunwale 20*c* through clearance holes provided on a mounting flange 92 of the second watercraft sensor assembly SA2.

Figure 7:
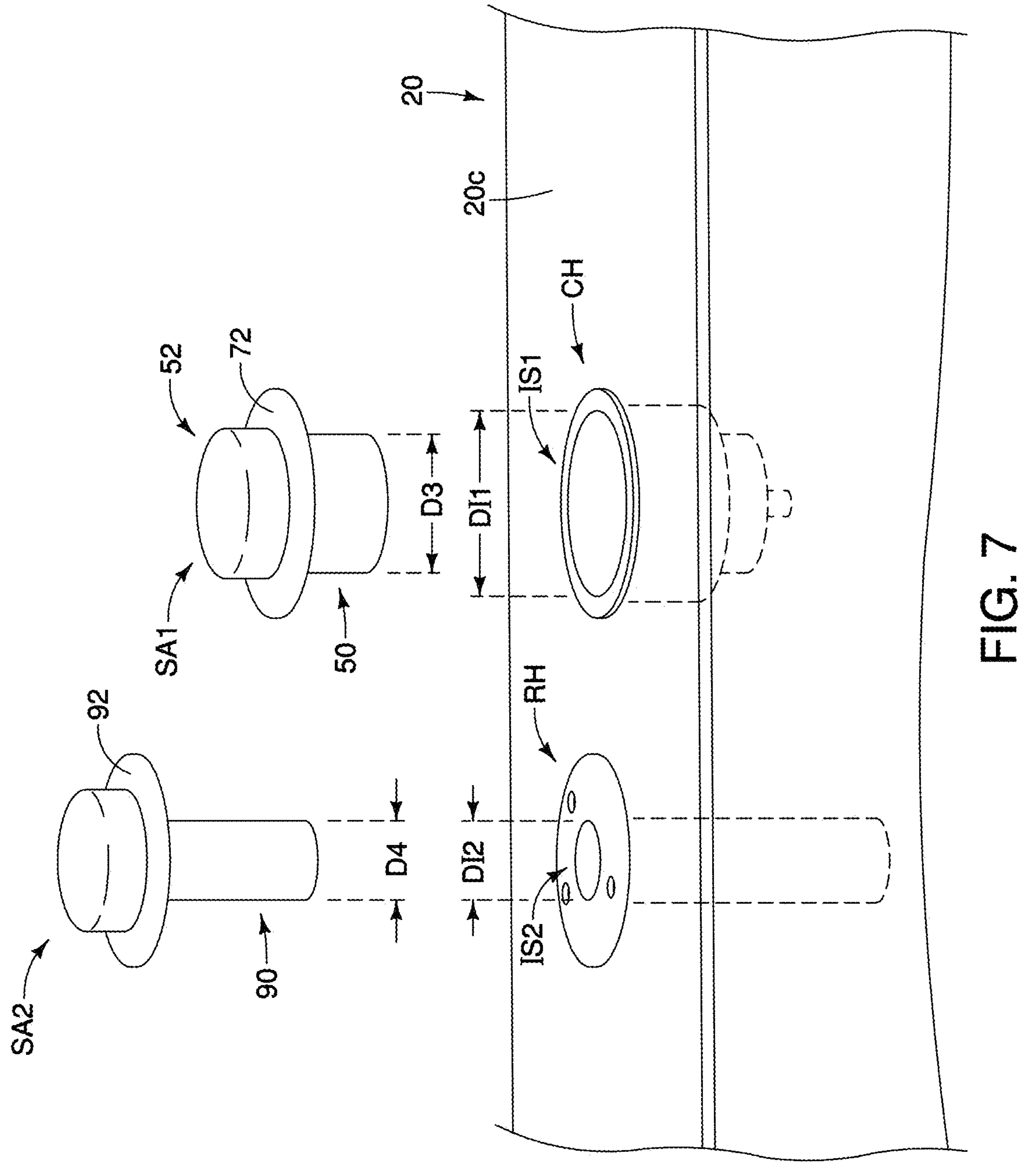
FIG. 7 is a schematic exploded partial perspective view of the side portion of the watercraft, showing installations of the watercraft sensor assemblies to the cup holder and the rod holder.

In the illustrated embodiment, as seen in FIG. 3, the first watercraft sensor assembly SA1 is inserted and attached to the through hole TH1 in replace of the cup holder CH, while the second watercraft sensor assembly SA2 is inserted and attached to the through hole TH2 in replace of the rod holder RH. However, the first and second watercraft sensor assemblies SA1 and SA2 can be attached to the watercraft body 20 in different manner. Specifically, as seen in FIG. 7, the first and second watercraft sensor assemblies SA1 and SA2 can be dimensioned such that the first and second watercraft sensor assemblies SA1 and SA2 are attachable to the cup-holder CH and the rod holder RH, respectively, which are also attached to the watercraft body 20. In this case, the interior space IS1 of the cup holder CH is utilized to install the first watercraft sensor assembly SA1 to the watercraft body 20, while the interior space IS2 of the rod holder RH is utilized to install the second watercraft sensor assembly SA2 to the watercraft body 20. More specifically, in this case, the outer diameter D3 of the inserted portion 50 of the first watercraft sensor assembly SA1 is made smaller than the inner diameter DI1 of the cup holder CH such that the inserted portion 50 can be inserted to the interior space IS1 of the cup holder CH. Similarly, the outer diameter D4 of the inserted portion 90 of the second watercraft sensor assembly SA2 is made smaller than the inner diameter D12 of the rod holder RH such that the inserted portion 90 can be inserted to the interior space IS2 of the rod holder RH.

Furthermore, in this case, as seen in FIG. 7, the first watercraft sensor assembly SA1 is securely attached to the watercraft body 20 via the cup holder CH by merely applying an adhesive and/or a sealing material between the mounting flange 72 and an opening edge of the cup holder CH. However, the first watercraft sensor assembly SA1 can also be secured to the watercraft body 20 using fixing parts or fasteners, such as bolts or screws that are fastened to screw holes provided on the gunwale 20*c* through clearance holes provided on the mounting flange 72. Similarly, the second watercraft sensor assembly SA2 is securely attached to the watercraft body 20 via the rod holder RH by merely applying an adhesive and/or a sealing material between the mounting flange 92 and an opening edge of the rod holder RH. However, the second watercraft sensor assembly SA2 can also be secured to the watercraft body 20 using fixing parts or fasteners, such as bolts or screws that are fastened to the screw holes SH2 (FIG. 3) provided on the gunwale 20*c* through clearance holes provided on the mounting flange 92 and a mounting flange of the rod holder RH.

Figure 8:
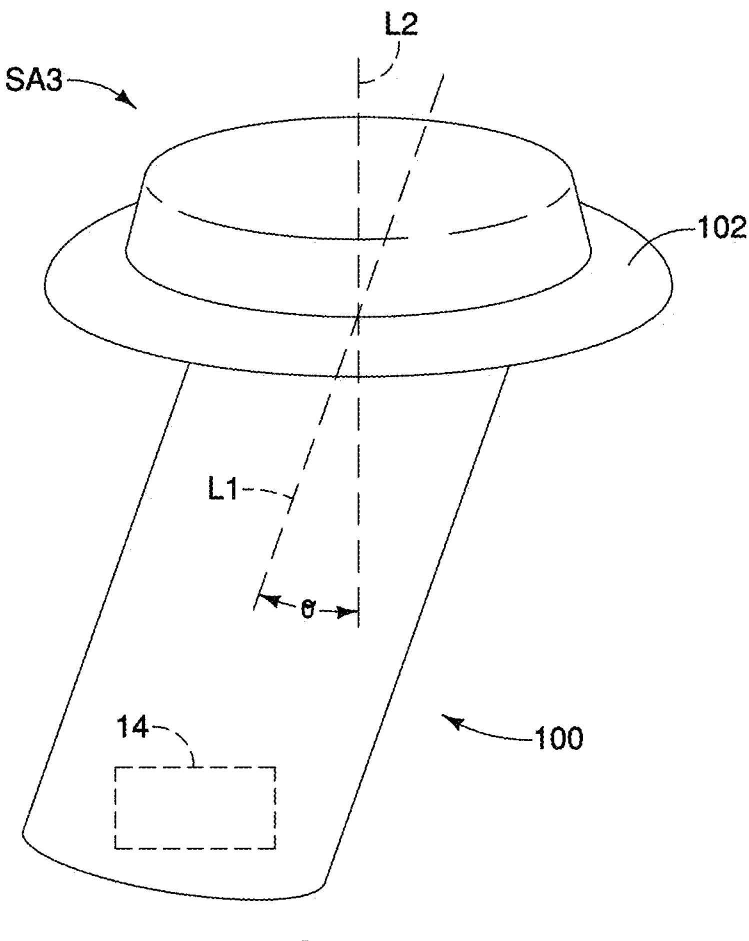
FIG. 8 is a perspective view of a watercraft sensor assembly in accordance with a modification example of the first embodiment.
Figure 9:
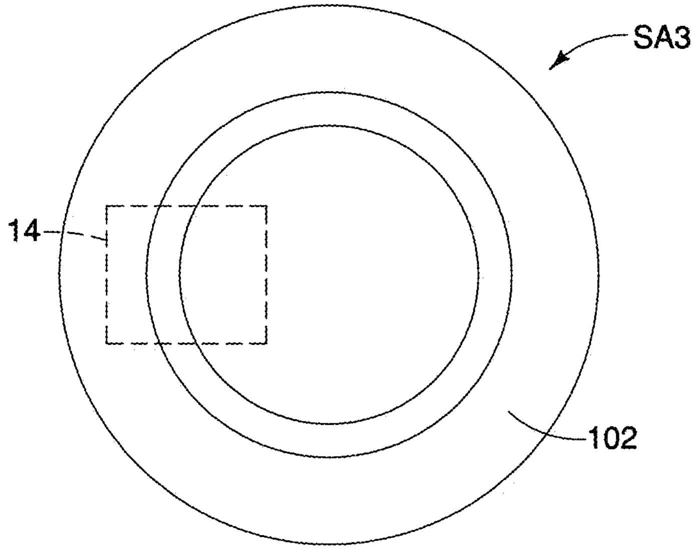
FIG. 9 is a top view of the watercraft sensor assembly shown in FIG. 9.

In the illustrated embodiment, as seen in FIGS. 3 and 4, the mounting flanges 72 and 92 of the first and second watercraft sensor assemblies SA1 and SA2 extend perpendicular to the inserted portions 50 and 90, respectively. With this configuration, the inserted portions 50 and 90 of the first and second watercraft sensor assemblies SA1 and SA2 are inserted and attached to straight or 90-degree holes (i.e., the through holes TH1 and TH2), which extend perpendicular to a top surface of the gunwale 20*c* of the watercraft body 20, while the mounting flanges 72 and 92 are entirely rested on the top surface of the gunwale 20*c* of the watercraft body 20. However, the first and second watercraft sensor assemblies SA1 and SA2 can be configured such that the first and second watercraft sensor assemblies SA1 and SA2 are attachable to angled holes, which extend in a non-perpendicular direction relative to the top surface of the gunwale 20*c* of the watercraft body 20, respectively. Specifically, as seen in FIGS. 8 and 9, a watercraft sensor assembly SA3 can have a cylindrical inserted portion 100 and an annular mounting flange 102 such that the inserted portion 100 extends in a non-perpendicular direction relative to the mounting flange 102. In particular, as seen in FIG. 8, the center axis L1 of the inserted portion 100 is inclined relative to the center axis L2 that is perpendicular to the mounting flange 102 by a predetermined angle θ, which is not 90 degrees (e.g., 15 degrees, 30 degrees, etc.). As seen in FIGS. 8 and 9, the watercraft sensor assembly SA3 includes the sensor 14 in the inserted portion 100. Furthermore, similar to the first watercraft sensor assembly SA1 shown in FIG. 4, the watercraft sensor assembly SA3 can also include the communication interface 15, the battery BP, the battery compartment 80 and the electrical wire 82 in the inserted portion 100. Furthermore, when the cup holder CH or the rod holder RH has an angled interior space, the watercraft sensor assembly SA3 can be attached to the watercraft body 20 via the cup holder CH or the rod holder RH by inserting the inserted portion 100 to the angled interior space of the cup holder CH or the rod holder RH. Other configurations of the watercraft sensor assembly SA3 are the same as the first and second watercraft sensor assemblies SA1 and SA2, and thus the configurations of the watercraft sensor assembly SA3 will not be discussed in detail here.

Second Embodiment

Figure 10:
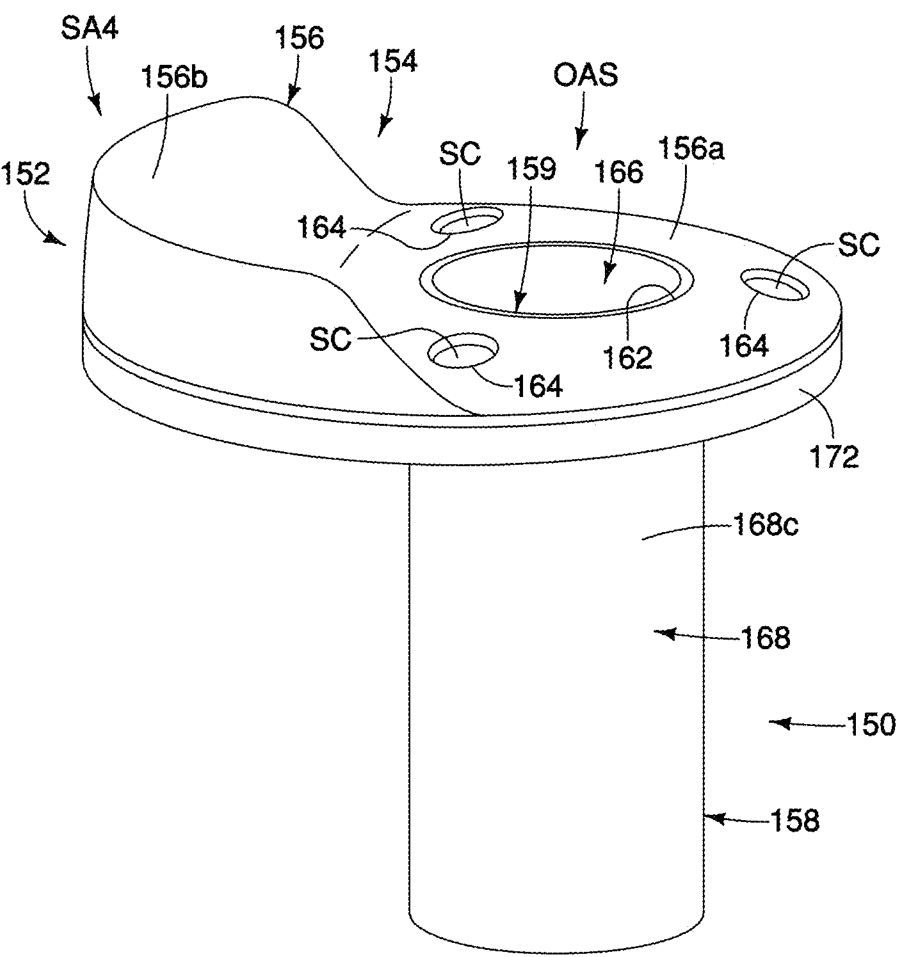
FIG. 10 is a perspective view of a watercraft sensor assembly in accordance with a second embodiment.
Figure 11:
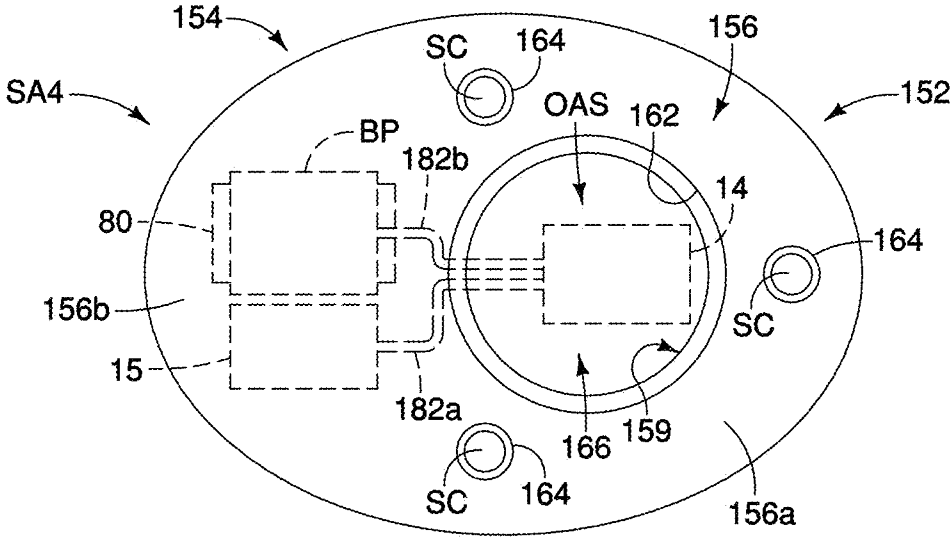
FIG. 11 is a top view of the watercraft sensor assembly shown in FIG. 10.
Figure 12:
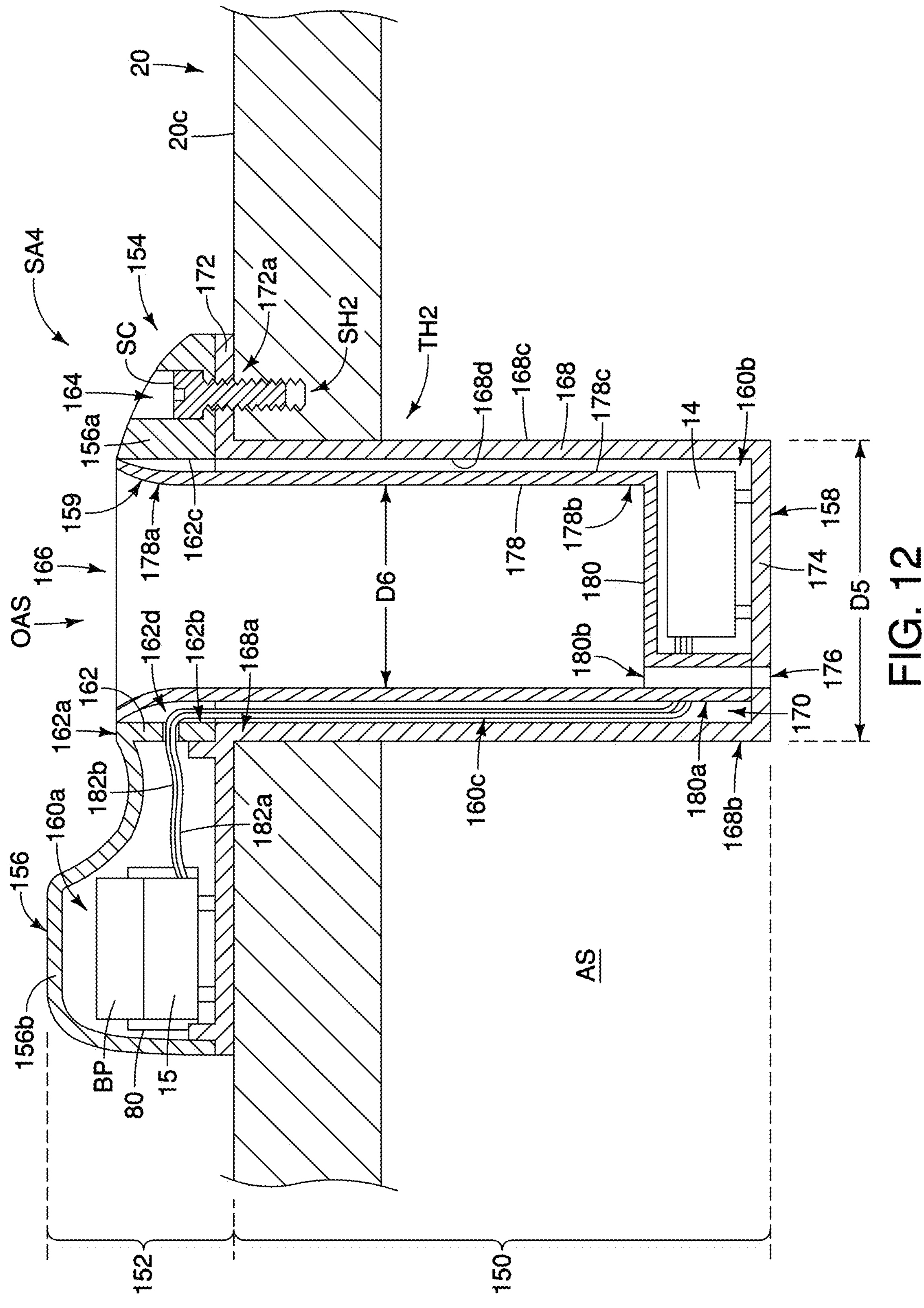
FIG. 12 is a cross-sectional view of the watercraft sensor assembly shown in FIGS. 10 and 11, showing an installed state of the watercraft sensor assembly to the gunwale of the watercraft.

Referring now to FIGS. 10-12, a watercraft sensor assembly SA4 is illustrated in accordance with a second embodiment. In the illustrated embodiment, as seen in FIGS. 10-12, the watercraft sensor assembly SA4 comprises the sensor 14, an inserted portion 150 and an extended portion 152. The inserted portion 150 is inserted into the accommodating space AS. The extended portion 152 is coupled to the inserted portion 150. The extended portion 152 is located outside the accommodating space AS in a state where the watercraft sensor assembly SA4 is installed in the accommodating space AS. In the illustrated embodiment, the sensor 14 is housed in the inserted portion 150.

As seen in FIGS. 10-12, the watercraft sensor assembly SA4 includes a housing 154 that houses the sensor 14 therewithin. The housing 154 includes an upper housing 156, a lower housing 158 and an inner sleeve 159 that are coupled to each other to form an upper interior housing space 160*a* between the upper housing 156 and the lower housing 158 and a lower interior housing space 160*b* between the lower housing 158 and the inner sleeve 159.

The upper housing 156 has an attachment flange 156*a* and an extended cover 156*b* that is connected to the attachment flange 156*a* so as to protrude laterally and upward from the attachment flange 156*a*. As seen in FIG. 11, the upper housing 156 has an overall ellipse shape. The attachment flange 156*a* includes an inner sidewall 162 and a plurality of (three in FIG. 10) counterbored holes 164. The inner sidewall 162 has an upper end 162*a*, a lower end 162*b* and an annular or cylindrical bore 162*c* extending between the upper end 162*a* and the lower end 162*b*. The upper end 162*a* defines an upwardly facing opening 166 of the watercraft sensor assembly SA4. The upper housing 156 is integrally formed as a one-piece, unitary member. The upper housing 156 is made of suitable materials that are typically used in watercrafts for a marine environment and are suitable for sensing operations of the sensor 14. For example, the upper housing 156 is made of suitable synthetic resin or metallic material.

The lower housing 158 has an annular or cylindrical sidewall 168 with an upper end 168*a* and a lower end 168*b*. The annular sidewall 168 is axially arranged relative to the inner sidewall 162 and has an interior space that is connected to the bore 162*c* to define a recess 170 of the watercraft sensor assembly SA4 when the upper housing 156 is attached to the lower housing 158. The annular side wall 168 has a mounting flange 172 that protrudes perpendicularly and radially outward from an outer peripheral surface 168*c* of the annular sidewall 168. The mounting flange 172 has an overall ellipse shape that corresponds to the overall shape of the upper housing 156. The mounting flange 172 has a plurality of (three) clearance holes 172*a* at locations corresponding to the counterbored holes 164. The mounting flange 172 can also have upward protrusions or rims that mate with a lower edge of the extended cover 156*b* of the upper housing 156 to position the upper housing 156 relative to the lower housing 158. With this configuration, when the upper housing 156 and the lower housing 158 are coupled to each other, the upper interior housing space 160*a* that is sealed from outside in a watertight manner is formed between the extended cover 156*b* of the upper housing 156 and the mounting flange 172 of the lower housing 158.

The lower housing 158 further has a bottom wall 174 that is connected to the annular sidewall 168 at the lower end 168*b*. In the illustrated embodiment, the lower housing 158 has a drain opening 176 on the bottom wall 174. In the illustrated embodiment, the lower housing 158 is integrally formed as a one-piece, unitary member. The lower housing 158 is made of suitable materials that are typically used in watercrafts for a marine environment and are suitable for sensing operations of the sensor 14. For example, the lower housing 158 is made of suitable synthetic resin or metallic material.

The inner sleeve 159 is disposed within the recess 170 of the watercraft sensor assembly SA4. The inner sleeve 159 has an annular or cylindrical sidewall 178 with an upper end 178*a* and a lower end 178*b*, and a bottom wall 180 that is connected to the annular sidewall 178 at the lower end 178*b*. In the illustrated embodiment, the upper end 178*a* is enlarged relative to other portions of the annular sidewall 178 so as to be coupled or connected to the upper end 162*a* of the inner sidewall 162. The annular sidewall 178 has a smaller outer diameter than an inner diameter of the recess 170 (an inner diameter of the bore 162*c* and the annular sidewall 168) to define an annular or ring-shaped space 160*c* between an inner peripheral surface 168*d* of the annular sidewall 168 (or inner peripheral surface of the bore 162) and an outer peripheral surface 178*c* of the annular sidewall 178. In the illustrated embodiment, the inner sidewall 162 of the upper housing 156 has a wire hole 162*d* that communicates the upper interior housing space 160*a* and the annular space 160*c*. In the illustrated embodiment, the inner sleeve 159 has a drainage portion 180*a* with a drain opening 180*b* on the bottom wall 180. In particular, the drainage portion 180*a* extends from the bottom wall 180 toward the bottom wall 174 of the lower housing 158 such that the drain opening 180*b* of the drainage portion 180*a* communicates with the drain opening 176. In the illustrated embodiment, the axial length of the inner sleeve 159 measured from the upper end 178*a* of the annular sidewall 178 to the bottom wall 180 is shorter than the axial length of the recess 170 of the watercraft sensor assembly SA4 to define the lower interior housing space 160*b* between the bottom wall 180 of the inner sleeve 159 and the bottom wall 174 of the lower housing 158. In the illustrated embodiment, the inner sleeve 159 is integrally formed as a one-piece, unitary member. The inner sleeve 159 is made of suitable materials that are typically used in watercrafts for a marine environment and are suitable for sensing operations of the sensor 14. For example, the inner sleeve 159 is made of suitable synthetic resin or metallic material.

In the illustrated embodiment, the watercraft sensor assembly SA4 is inserted and attached to the through hole TH2 in replace of the rod holder RH. As seen in FIG. 12, when the watercraft sensor assembly SA4 is inserted and attached to the through hole TH2, the mounting flange 172 is rested on an edge portion of the through hole TH2 above the gunwale 20*c* of the watercraft body 20. Thus, in the illustrated embodiment, a lower part of the lower housing 158 below the mounting flange 172 forms the inserted portion 150 of the watercraft sensor assembly SA4, while the upper housing 156, an upper part of the lower housing 158 above the mounting flange 172, and the mounting flange 172 form the extended portion 152. Thus, in the illustrated embodiment, the extended portion 152 has the upwardly facing opening 166, and the inserted portion 150 has the recess 170 extending downward from the upwardly facing opening 166. Furthermore, in the illustrated embodiment, the inserted portion 150 has the drain opening 176 at an end opposite to the extended portion 152. In the illustrated embodiment, the housing 154 is formed by the upper housing 156, the lower housing 158 and the inner sleeve 159 that are coupled to each other. Of course, the housing 154 can have different configurations. For example, the mounting flange 172 can be provided to the upper housing 156, the upper housing 156 can be extended below the edge portion of the through hole TH2, etc.

As seen in FIG. 12, the annular sidewall 168 (the outer peripheral surface 168*c*) has an outer diameter D5 corresponding to the diameter D2 (FIG. 2) of the through hole TH2. Specifically, the diameter D5 of the annular sidewall 168 is smaller than the diameter D2 of the through hole TH2 such that the inserted portion 150 can be inserted to the through hole TH2. In the illustrated embodiment, the watercraft sensor assembly SA4 is secured to the watercraft body 20 using fixing parts or fasteners, such as bolts or screws SC that are fastened to the screw holes SH2 provided on the gunwale 20*c* through the counterbored holes 164 provided on the upper housing 156 and the clearance holes 172*a* provided on the lower housing 158. With this configuration, the upper housing 156 and the lower housing 158 are also fixedly attached together with the fastening force of the screws SC. Thus, in the illustrated embodiment, the watercraft sensor assembly SA4 further comprises the screws SC (e.g., the fixing parts) configured to fix the extended portion 152 to the watercraft body 20 of the watercraft 10.

Furthermore, as also seen in FIG. 12, the inner sleeve 159 has an inner diameter D6 corresponding to the inner diameter D12 (FIG. 2) of the rod holder RH for accommodating a fishing rod, a flag pole or other object on the watercraft body 20. Thus, in the illustrated embodiment, the watercraft sensor assembly SA4 can also serve as the rod holder RH. Therefore, the interior space of the inner sleeve 159 and the recess 170, in which the inner sleeve 159 is disposed, define an object accommodating space OAS configured to receive an object, such as a fishing rod, a flag pole, etc., other than the watercraft sensor assembly SA4. Of course, the watercraft sensor assembly SA4 can be dimensioned in different manner. For example, the watercraft sensor assembly SA4 can be configured such that the inner sleeve 159 has an inner diameter corresponding to the inner diameter DI1 of the cup holder CH. In this case, the watercraft sensor assembly SA4 can serve as the cup holder CH, for example.

As seen in FIG. 12, the sensor 14 is housed in the lower interior housing space 160*b*, while the communication interface 15 is housed in the upper interior housing space 160*a*. Thus, in the illustrated embodiment, the sensor 14 is located inside the inserted portion 150, while the communication interface 15 is located inside the extended portion 152. Specifically, the sensor 14 is disposed on the bottom wall 174 of the lower housing 158 below the bottom wall 180 of the inner sleeve 159, and is disposed adjacent to the bottom of the recess 170 of the watercraft sensor assembly SA4. The sensor 14 and the communication interface 15 are electrically connected to the each other via an electrical wire 182*a* that is routed between the upper interior housing space 160*a* and the lower interior housing space 160*b* through the wire hole 162*d* formed on the inner sidewall 162 of the upper housing 156 and the annular space 160*c*. Furthermore, in the illustrated embodiment, the battery BP held by the battery compartment 80 is also housed in the upper interior housing space 160*a*, and is electrically connected to the sensor 14 via an electrical wire 182*b*. Thus, in the illustrated embodiment, the watercraft sensor assembly SA4 further comprises the battery compartment 80 and the electrical wire 182*b* that is electrically connected to the sensor 14 and is electrically connected to the battery BP.

In the illustrated embodiment, the sensor 14 is located inside the inserted portion 150, while the communication interface 15 and the battery BP are located inside the extended portion 152. However, the sensor 14, the communication interface 15 and the battery BP can be housed in the watercraft sensor assembly SA4 in different manner. For example, the sensor 14 can be located inside the upper interior housing space 160*a* in the extended portion 152. The communication interface 15 can be located inside the lower interior housing space 160*b* in the inserted portion 150. The battery BP can be located inside the lower interior housing space 160*b* in the inserted portion 150. In any case, the electrical wire 182*a* can be fully located inside the inserted portion 50 or the extended portion 52, or partially located inside the inserted portion 50 and partially located inside the extended portion 52 depending on the arrangement of the sensor 14 and the communication interface 15. Also, the electrical wire 182*b* can be fully located inside the inserted portion 50 or the extended portion 52, or partially located inside the inserted portion 50 and partially located inside the extended portion 52 depending on the arrangement of the sensor 14 and the battery BP.

In the illustrated embodiment, as seen in FIG. 12, the sensor 14 is disposed on the bottom of the watercraft sensor assembly SA4. The housing 154 of the watercraft sensor assembly SA4 is made to ensure that communication signals or sensing signals may pass through the housing 154 with minimal interference. As mentioned above, such communication technologies include Wi-Fi connection, Bluetooth link, Near-field communication, satellite link or other radio communication by the communication interface 15, while such sensing technologies include sensing using sonar, lidar, radar, GPS, or cameras by the sensor 14. Furthermore, the watercraft sensor assembly SA4 can further be modified to include complementary materials or wirings or to have different configurations in order to amplify the communication signals or the sensing signals via techniques of reflection, refraction and diffraction, in order to convert analog signal to digital signal of the communication or sensing technology, and/or in order to pass the communication signals or the sensing signals through the housing 154. In the illustrated embodiment, the inner sleeve 159 is utilized to accommodate the sensor 14 or other electronic parts, such as the electric wirings 182*a* and 182*b*, to shield or cover various components of the watercraft sensor assembly SA4 while providing accessible measures to those parts, and to provide conventional utility, as a rod holder RH and/or a cup holder CH. On the other hand, the inner sleeve 159 can be further designed to ensure sensing ability of the sensor 14. In particular, the inner sleeve 159 can be further designed, by changing its shape or material, to amplify the reception or transmission signals of the sensor 14 or to propagate signals into the watercraft body 20.

In the illustrated embodiment, as seen in FIG. 12, the watercraft sensor assembly SA4 is inserted and attached to the through hole TH2 in replace of the rod holder RH. However, the watercraft sensor assembly SA4 can be attached to the watercraft body 20 in different manner. Specifically, the watercraft sensor assembly SA4 can be dimensioned such that the watercraft sensor assembly SA4 is attachable to the cupholder CH or the rod holder RH that is also attached to the watercraft body 20. In this case, the interior space IS1 of the cup holder CH or the interior space IS2 of the rod holder RH is utilized to install the watercraft sensor assembly SA4 to the watercraft body 20. More specifically, in this case, the outer diameter D5 of the inserted portion 150 of the watercraft sensor assembly SA4 is made smaller than the inner diameter DI1 of the cup holder CH or the inner diameter D12 of the rod holder RH such that the inserted portion 150 can be inserted to the interior space IS1 of the cup holder CH or the interior space IS2 of the rod holder RH.

Figure 13:
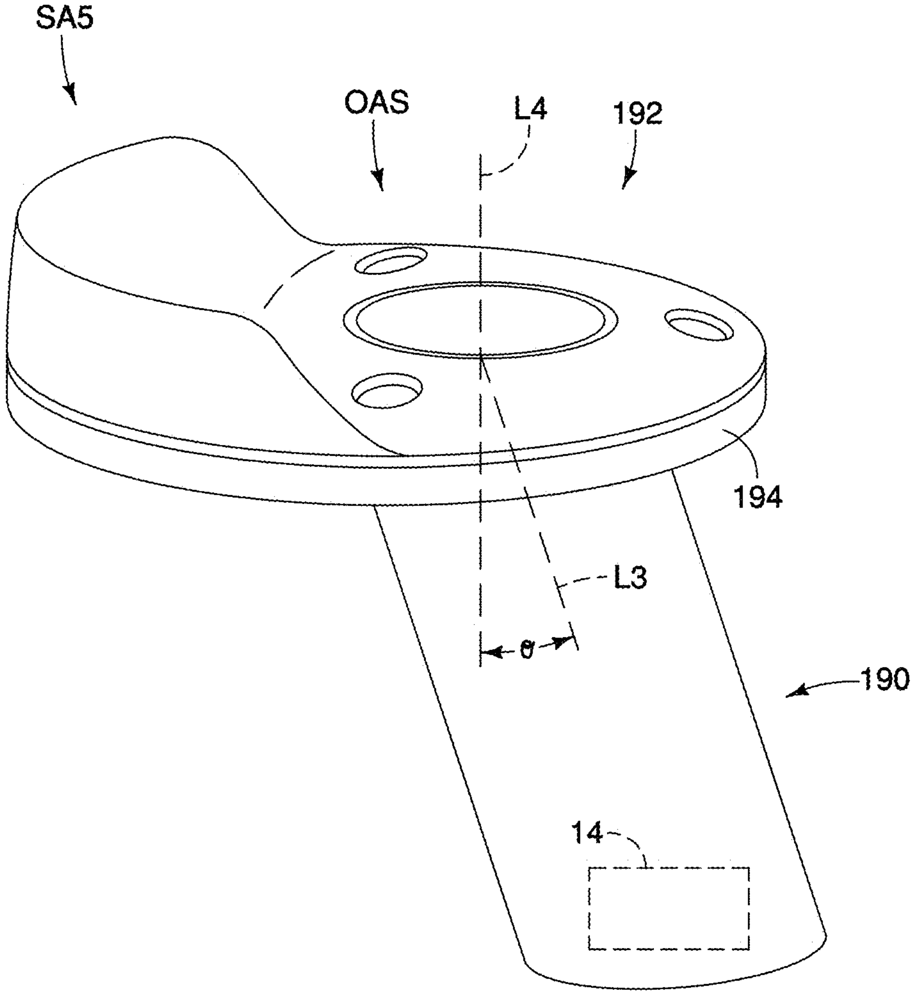
FIG. 13 is a perspective view of a watercraft sensor assembly in accordance with a modification example of the second embodiment.

In the illustrated embodiment, as seen in FIG. 12, the mounting flange 172 of the watercraft sensor assemblies SA4 extends perpendicular to the inserted portion 150. With this configuration, the inserted portion 150 of the watercraft sensor assembly SA4 is inserted and attached to a straight or 90-degree hole (i.e., the through hole TH2), while the mounting flange 172 is entirely rested on the top surface of the gunwale 20*c* of the watercraft body 20. However, the watercraft sensor assembly SA4 can be configured such that the watercraft sensor assembly SA4 is attachable to an angled hole, which extends in a non-perpendicular direction relative to the top surface of the gunwale 20*c* of the watercraft body 20. Specifically, as seen in FIG. 13, a watercraft sensor assembly SA5 can have a cylindrical inserted portion 190 and an extended portion 192. The watercraft sensor assembly SA5 can also have a mounting flange 194 such that the inserted portion 190 extends in a non-perpendicular direction relative to the mounting flange 194. In particular, as seen in FIG. 13, the center axis L3 of the inserted portion 190 is inclined relative to the center axis L4 that is perpendicular to the mounting flange 194 by a predetermined angle θ, which is not 90 degrees (e.g., 15 degrees, 30 degrees, etc.) and corresponds to an angle of the angled hole provided on the gunwale 20*c* of the watercraft 20. As seen in FIG. 13, the watercraft sensor assembly SA5 includes the sensor 14 in the inserted portion 190. Furthermore, similar to the watercraft sensor assembly SA4 shown in FIGS. 10-12, the watercraft sensor assembly SA5 can also house the communication interface 15, the battery BP and the battery compartment 80 and the electrical wires 182*a* and 182*b* in the extended portion 192. With this configuration, the watercraft sensor assembly SA5 includes a cylindrical object accommodating space OAS that extends along the angled hole provided on the gunwale 20*c* of the watercraft 20. Furthermore, when the cup holder CH or the rod holder RH has an angled interior space, the watercraft sensor assembly SA5 can be attached to the watercraft body 20 via the cup holder CH or the rod holder RH by inserting the inserted portion 190 to the angled interior space of the cup holder CH or the rod holder RH. Other configurations of the watercraft sensor assembly SA5 are the same as the watercraft sensor assembly SA4, and thus the configurations of the watercraft sensor assembly SA5 will not be discussed in detail here.

Third Embodiment

Figure 14:
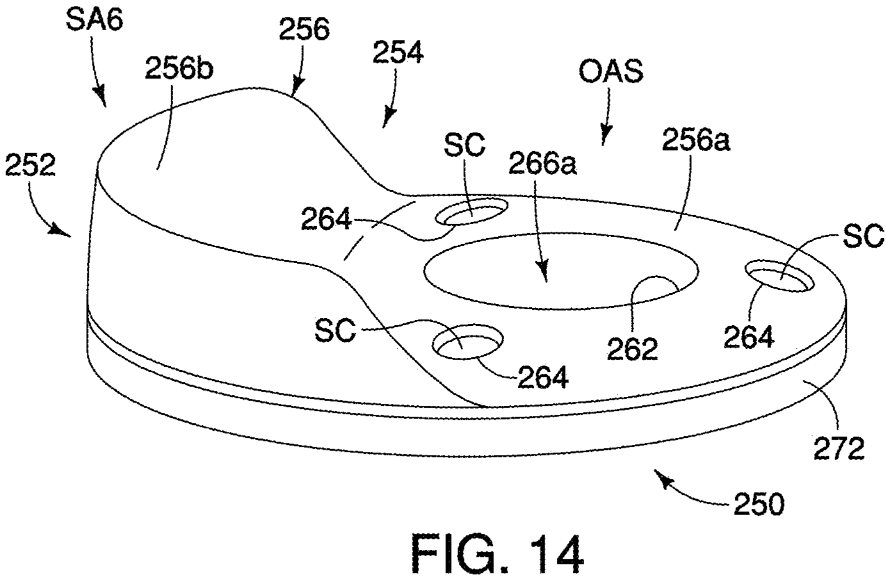
FIG. 14 is a perspective view of a watercraft sensor assembly in accordance with a third embodiment.
Figure 15:
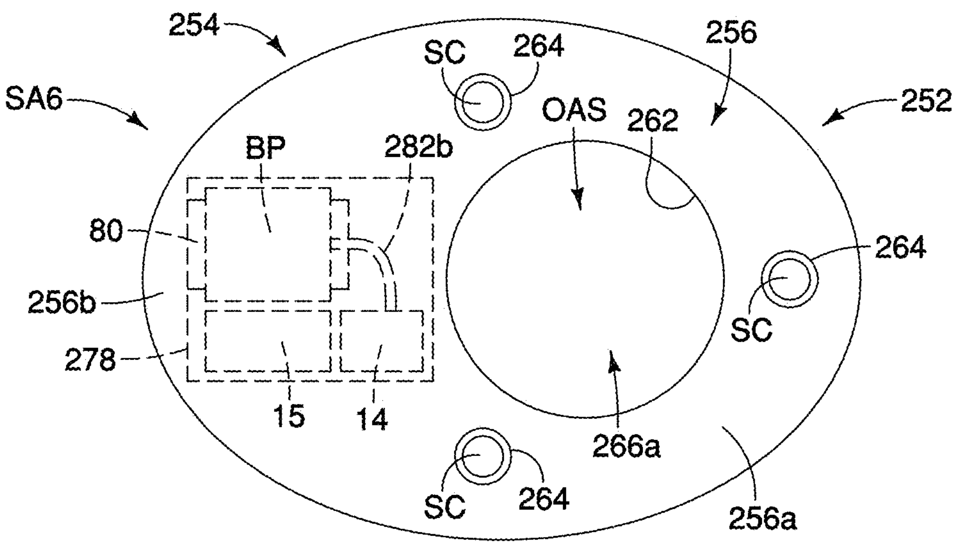
FIG. 15 is a top view of the watercraft sensor assembly shown in FIG. 15.
Figure 16:
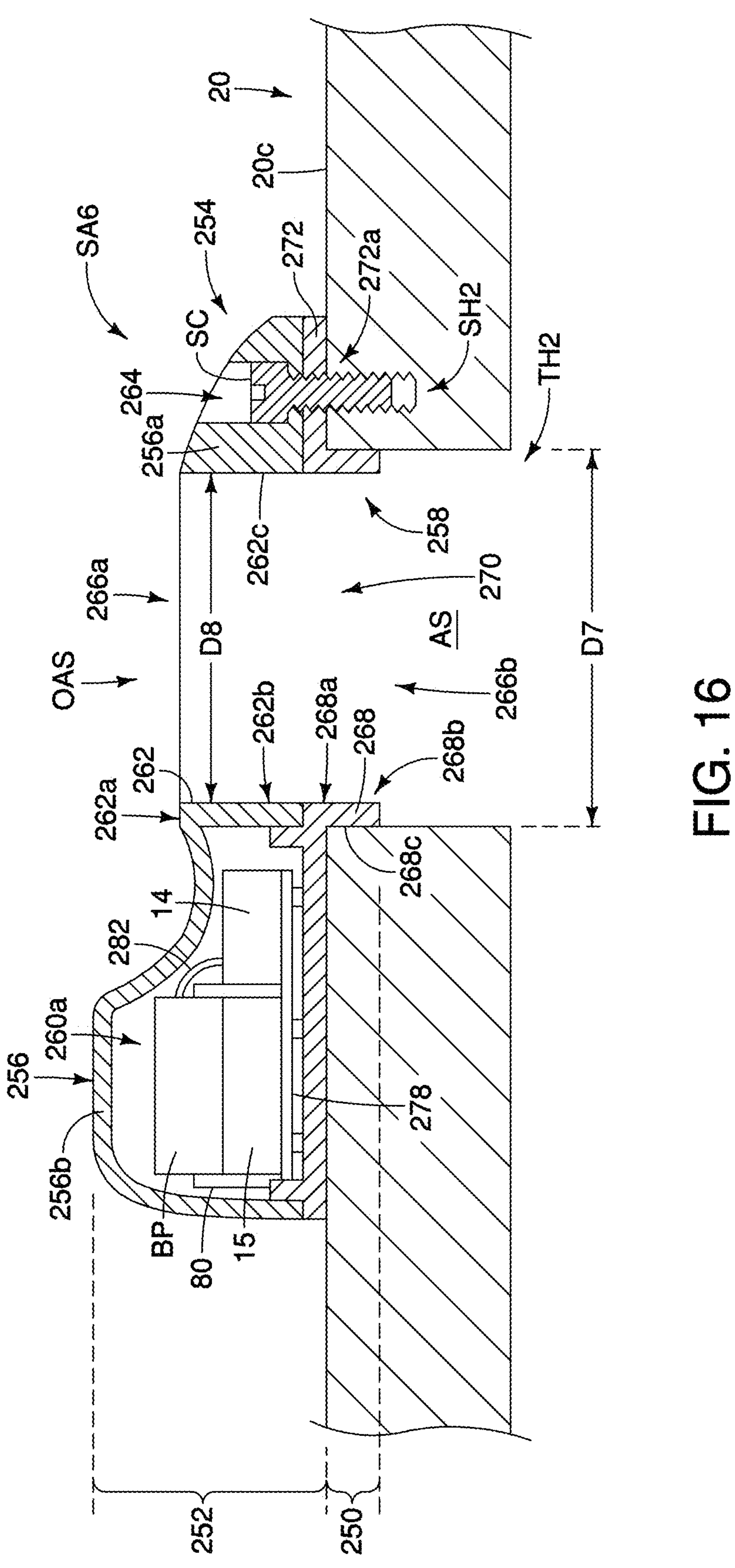
FIG. 16 is a cross-sectional view of the watercraft sensor assembly shown in FIGS. 14 and 15.

Referring now to FIGS. 14-16, a watercraft sensor assembly SA6 is illustrated in accordance with a third embodiment. In the illustrated embodiment, as seen in FIGS. 14-16, the watercraft sensor assembly SA6 comprises the sensor 14, an inserted portion 250 and an extended portion 252. The inserted portion 250 is inserted into the accommodating space AS. The extended portion 252 is coupled to the inserted portion 250. The extended portion 252 is located outside the accommodating space AS in a state where the watercraft sensor assembly SA6 is installed in the accommodating space AS. In the illustrated embodiment, the sensor 14 is housed in the extended portion 250.

As seen in FIGS. 14-16, the watercraft sensor assembly SA6 includes a housing 254 that houses the sensor 14 therewithin. The housing 254 includes an upper housing 256 and a lower housing 258 that are coupled to each other to form an interior housing space 260 between the upper housing 256 and the lower housing 258.

The upper housing 256 is identical to the upper housing 156 of the watercraft sensor assembly SA4 shown in FIG. 12, and thus the configurations of the upper housing 256 will not be discussed in detail herein. As seen in FIG. 16, the upper housing 256 has an attachment flange 256*a* and an extended cover 256*b* that is connected to the attachment flange 256*a* so as to protrude laterally and upward from the attachment flange 256*a*. The attachment flange 256*a* includes an inner sidewall 262 and a plurality of (three in FIG. 14) counterbored holes 264. The inner sidewall 262 has an upper end 262*a*, a lower end 262*b* and an annular or cylindrical bore 262*c* extending between the upper end 262*a* and the lower end 262*b*. The upper end 262*a* defines an upwardly facing opening 266*a* of the watercraft sensor assembly SA6.

The lower housing 258 is identical to the lower housing 158 of the watercraft sensor assembly SA4 shown in FIG. 12, except that the lower housing 258 does not have a bottom wall that is connected to an annular or cylindrical sidewall 268 and the annular sidewall 268 have different axial length from the annular sidewall 168 of the lower housing 158 of the watercraft assembly SA4 shown in FIG. 12. Thus, the configurations of the lower housing 258 will not be discussed in detail herein. As seen in FIG. 16, the annular sidewall 268 has an upper end 268*a* and a lower end 268*b*. The annular sidewall 268 is axially arranged relative to the inner sidewall 262 and has an interior space that is connected to the bore 262*c* to define a bottomless recess 270 of the watercraft sensor assembly SA6 when the upper housing 256 is attached to the lower housing 258. Thus, the lower end 268*b* defines a downwardly facing opening 266*b* of the watercraft sensor assembly SA6. The annular side wall 268 has a mounting flange 272 that protrudes perpendicularly and radially outward from an outer peripheral surface 268*c* of the annular sidewall 268. With this configuration, when the upper housing 256 and the lower housing 258 are coupled to each other, the interior housing space 260 that is sealed from outside in a watertight manner is formed between the extended cover 256*b* of the upper housing 256 and the mounting flange 272 of the lower housing 258.

In the illustrated embodiment, the watercraft sensor assembly SA6 is inserted and attached to the through hole TH2 in replace of the rod holder RH. As seen in FIG. 16, when the watercraft sensor assembly SA6 is inserted and attached to the through hole TH2, the mounting flange 272 is rested on an edge portion of the through hole TH2 above the gunwale 20*c* of the watercraft body 20. Thus, in the illustrated embodiment, a lower part of the lower housing 258 below the mounting flange 272 forms the inserted portion 250 of the watercraft sensor assembly SA6, while the upper housing 256, an upper part of the lower housing 258 above the mounting flange 272, and the mounting flange 272 form the extended portion 252. Thus, in the illustrated embodiment, the extended portion 252 has the upwardly facing opening 266*a*, and the inserted portion 250 has the recess 270 extending downward from the upwardly facing opening 266*a*. In the illustrated embodiment, the housing 254 is formed by the upper housing 256 and the lower housing 258 that are coupled to each other. Of course, the housing 254 can have different configurations. For example, the mounting flange 272 can be provided to the upper housing 256, the upper housing 256 can be extended below the edge portion of the through hole TH2, etc.

As seen in FIG. 16, the annular sidewall 268 (the outer peripheral surface 268*c*) has an outer diameter D7 corresponding to the diameter D2 (FIG. 2) of the through hole TH2. Specifically, the diameter D7 of the annular sidewall 268 is smaller than the diameter D2 of the through hole TH2 such that the inserted portion 250 can be inserted to the through hole TH2. In the illustrated embodiment, the watercraft sensor assembly SA6 is secured to the watercraft body 20 using fixing parts or fasteners, such as bolts or screws SC that are fastened to the screw holes SH2 provided on the gunwale 20*c* through counterbored holes 264 provided on the upper housing 256 and clearance holes 272*a* provided on the lower housing 258. With this configuration, the upper housing 256 and the lower housing 258 are also fixedly attached together with the fastening force of the screws SC. Thus, in the illustrated embodiment, the watercraft sensor assembly SA6 further comprises the screws SC (e.g., the fixing parts) configured to fix the extended portion 252 to the watercraft body 20 of the watercraft 10.

Furthermore, as also seen in FIG. 16, the annular sidewall 268 and the bore 262*c* of the inner sidewall 262 have an inner diameter D8 corresponding to the inner diameter D12 (FIG. 2) of the rod holder RH for accommodating a fishing rod, a flag pole or other object on the watercraft body 20. Thus, in the illustrated embodiment, the watercraft sensor assembly SA6 can also serve as the rod holder RH. Therefore, the recess 270 defines an object accommodating space OAS configured to receive an object, such as a fishing rod, a flag pole, etc., other than the watercraft sensor assembly SA6. Of course, the watercraft sensor assembly SA6 can be dimensioned in different manner. For example, the watercraft sensor assembly SA6 can be configured such that the annular sidewall 268 and the bore 262*c* of the inner sidewall 262 have an inner diameter corresponding to the inner diameter DI1 of the cup holder CH. In this case, the watercraft sensor assembly SA6 can serve as the cup holder CH, for example. In any case, the watercraft sensor assembly SA6 can also use the interior space of the hull 20*b* as the object accommodating space OAS. In other words, the watercraft sensor assembly SA6 can use the interior space of the hull 20*b* as the rod holder RH or the cup holder CH having the shape inherited by the shape of the hull 20*b*. Furthermore, the watercraft sensor assembly SA6 can be used with an additional container or adaptor that is attached to the watercraft sensor assembly SA6 or the watercraft body 20 (e.g., the gunwale 20*c*) for supporting an end of the fishing rod, the flag pole, the cup, etc.

As seen in FIG. 16, the sensor 14 and the communication interface 15 are housed in the interior housing space 260. Thus, in the illustrated embodiment, the sensor 14 and the communication interface 15 are located inside the extended portion 252. The sensor 14 and the communication interface 15 are mounted on a printed wiring board or substrate 278, and are electrically connected to each other. Furthermore, in the illustrated embodiment, the battery BP held by the battery compartment 80 is also housed in the interior housing space 260, and is electrically connected to the sensor 14 via an electrical wire 282. Thus, in the illustrated embodiment, the watercraft sensor assembly SA6 further comprises the battery compartment 80 and the electrical wire 282 that is electrically connected to the sensor 14 and is electrically connected to the battery BP.

In the illustrated embodiment, as seen in FIG. 16, the watercraft sensor assembly SA6 is inserted and attached to the through hole TH2 in replace of the rod holder RH. However, the watercraft sensor assembly SA6 can be attached to the watercraft body 20 in different manner. Specifically, the watercraft sensor assembly SA6 can be dimensioned such that the watercraft sensor assembly SA6 is attachable to the cupholder CH or the rod holder RH that is attached to the watercraft body 20. In this case, the interior space IS1 of the cup holder CH or the interior space IS2 of the rod holder RH is utilized to install the watercraft sensor assembly SA6 to the watercraft body 20. More specifically, in this case, the outer diameter D7 of the inserted portion 250 of the watercraft sensor assembly SA6 can be made smaller than the inner diameter DI1 of the cup holder CH or the inner diameter D12 of the rod holder RH such that the inserted portion 250 can be inserted to the interior space IS1 of the cup holder CH or the interior space IS2 of the rod holder RH.

Figures 17, 18, 19:
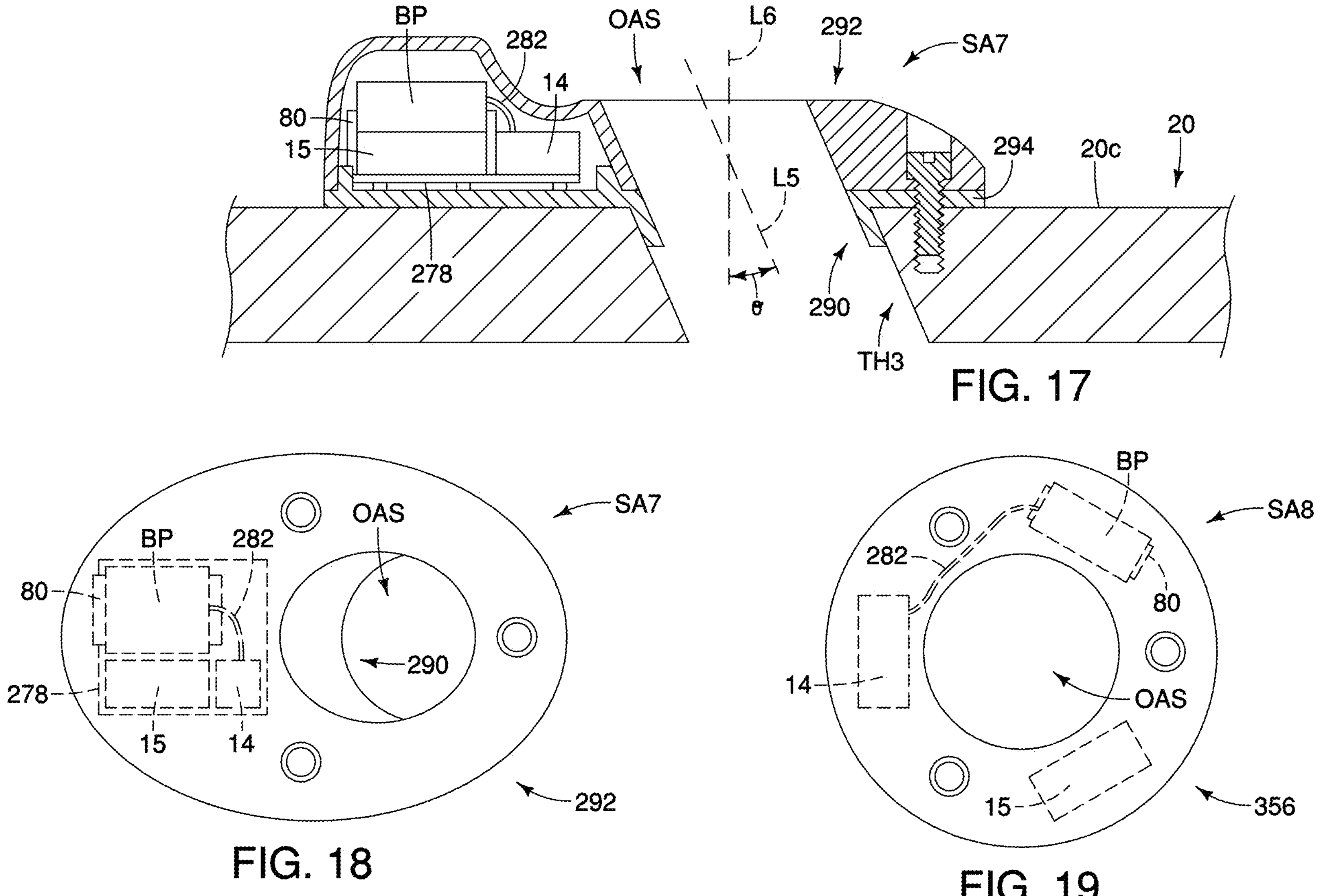
FIG. 17 is a cross-sectional view of a watercraft sensor assembly in accordance with a modification example of the third embodiment.
FIG. 18 is a top view of the watercraft sensor assembly shown in FIG. 17.
FIG. 19 is a top view of a watercraft sensor assembly with another modification example of the third embodiment.

In the illustrated embodiment, as seen in FIG. 16, the mounting flange 272 of the watercraft sensor assemblies SA6 extends perpendicular to the inserted portion 250. With this configuration, the inserted portion 250 of the watercraft sensor assembly SA6 is inserted and attached to a straight or 90-degree hole (i.e., the through hole TH2), while the mounting flange 272 is entirely rested on the top surface of the gunwale 20*c* of the watercraft body 20. However, the watercraft sensor assembly SA6 can be configured such that the watercraft sensor assembly SA6 is attachable to an angled hole, which extends in a non-perpendicular direction relative to the top surface of the gunwale 20*c* of the watercraft body 20. Specifically, as seen in FIGS. 17 and 18, a watercraft sensor assembly SA7 can have a cylindrical inserted portion 290 and an extended portion 292. The watercraft sensor assembly SA7 can also have a mounting flange 294 such that the inserted portion 290 extends in a non-perpendicular direction relative to the mounting flange 294. In particular, as seen in FIG. 17, the center axis L5 of the inserted portion 290 is inclined relative to the center axis L6 that is perpendicular to the mounting flange 294 by a predetermined angle θ, which is not 90 degrees (e.g., 15 degrees, 30 degrees, etc.) and corresponds to an angle of an angled hole TH3 provided on the gunwale 20*c* of the watercraft 20. Furthermore, similar to the watercraft sensor assembly SA6 shown in FIGS. 14-16, the watercraft sensor assembly SA7 can house the sensor 14, the communication interface 15, the battery BP, the battery compartment 80, the substrate 278 and the electrical wire 282 in the extended portion 292. With this configuration, the watercraft sensor assembly SA7 includes a cylindrical object accommodating space OAS that extends along the angled hole TH3. Furthermore, when the cup holder CH or the rod holder RH has an angled interior space, the watercraft sensor assembly SA7 can be attached to the watercraft body 20 via the cup holder CH or the rod holder RH by inserting the inserted portion 290 to the angled interior space of the cup holder CH or the rod holder RH. Other configurations of the watercraft sensor assembly SA7 are the same as the watercraft sensor assembly SA6, and thus the configurations of the watercraft sensor assembly SA7 will not be discussed in detail here.

In the illustrated embodiment, as seen in FIG. 15, the watercraft sensor assembly SA6 has an overall ellipse shape. However, the watercraft sensor assembly SA6 can have different shape. Specifically, as seen in FIG. 19, a watercraft sensor assembly SA8 can have a circular outer shape, for example. Furthermore, in this case, electrical components, such as the sensor 14, the communication interface 15, the battery BP, the battery compartment 80 and the electrical wire 282 can be arranged in an extended portion 356 about an object accommodating space OAS. Other configurations of the watercraft sensor assembly SA8 are the same as the watercraft sensor assembly SA6, and thus the configurations of the watercraft sensor assembly SA8 will not be discussed in detail here.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a watercraft floating in calm water.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A sensor assembly for a watercraft comprising:
- a sensor including at least one of a GPS transmitter, a GPS receiver, a camera, a radar device, a lidar device and a sonar device;
- an inserted portion configured to be inserted into an accommodating space provided on a watercraft to accommodate an object; and
- an extended portion coupled to the inserted portion and configured to be located outside the accommodating space in a state where the sensor assembly is installed in the accommodating space, the extended portion having an upwardly facing opening,
- the sensor being housed in at least one of the inserted portion and the extended portion,
- the inserted portion having a recess extending downward from the opening, and
- the recess defining an object accommodating space configured to receive an object other than the sensor assembly, such that the sensor assembly serves as a rod holder or a cup holder.

2. The sensor assembly according to claim 1, further comprising
- a fixing part configured to fix the extended portion to the watercraft.

3. The sensor assembly according to claim 1, further comprising
- a communicator configured to transmit data obtained by the sensor to an electronic controller, and
- at least one of the sensor and the communicator being at least partially located inside the extended portion.

4. The sensor assembly according to claim 3, wherein
- one of the sensor and the communicator is at least partially provided to the extended portion, and
- the other one of the sensor and the communicator is at least partially provided to the inserted portion.

5. The sensor assembly according to claim 1, wherein
- at least part of the sensor is provided to the extended portion.

6. The sensor assembly according to claim 1, further comprising
- at least one of a battery compartment and an electrical wire that is electrically connected to the sensor and is configured to be electrically connected to a battery.

7. The sensor assembly according to claim 1, wherein
- the inserted portion has a cylindrical shape, and
- at least part of the sensor is located in the inserted portion.

8. The sensor assembly according to claim 1, wherein
- at least part of the sensor is disposed adjacent to a bottom of the recess.

9. The sensor assembly according to claim 1, wherein
- the inserted portion has a drain opening at an end opposite to the extended portion.

10. An operation support system comprising the sensor assembly according to claim 1, further comprising
- an electronic controller configured to receive data obtained by the sensor of the sensor assembly to control an operation of the watercraft.

11. The sensor assembly according to claim 1, wherein the sensor assembly is attached to
- a through hole provided to a gunwale of the watercraft for mounting a cup holder or a rod holder, or
- a cup holder or a rod holder mounted to the gunwale of the watercraft.

12. A watercraft comprising the sensor assembly according to claim 1, further comprising
- a watercraft body to which the sensor assembly is installed.

13. A sensor assembly for a watercraft comprising:
- a sensor including at least one of a GPS transmitter, a GPS receiver, a camera, a radar device, a lidar device and a sonar device;
- an inserted portion configured to be inserted into an accommodating space provided on a watercraft to accommodate an object; and
- an extended portion coupled to the inserted portion and configured to be located outside the accommodating space in a state where the sensor assembly is installed in the accommodating space, the extended portion having an upwardly facing opening,
- the sensor being housed in a housing space defined by at least one of the inserted portion and the extended portion in the at least one of the inserted portion and the extended portion, and the inserted portion having a recess that extends downward from the opening and is isolated from the housing space.

* * * * *